(12) United States Patent
Chliwnyj et al.

(10) Patent No.: US 6,833,973 B2
(45) Date of Patent: Dec. 21, 2004

(54) APPARATUS AND METHOD TO CALIBRATE A SERVO SENSOR

(75) Inventors: Alex Chliwnyj, Tucson, AZ (US); Christopher R. Pandolfo, San Jose, CA (US); David L. Swanson, Tucson, AZ (US); Steven C. Wills, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 10/185,541

(22) Filed: Jun. 27, 2002

(65) Prior Publication Data

US 2004/0001267 A1 Jan. 1, 2004

(51) Int. Cl.[7] .............................................. G11B 5/584
(52) U.S. Cl. .................................................... 360/77.12
(58) Field of Search ............................... 360/77.12, 75, 360/78.02

(56) References Cited

U.S. PATENT DOCUMENTS

| | | | | |
|---|---|---|---|---|
| 4,677,505 A | * | 6/1987 | Nukada et al. | 360/77.12 |
| 5,294,791 A | * | 3/1994 | Pahr | 360/77.12 |
| 5,457,586 A | * | 10/1995 | Solhjell | 360/77.12 |
| 5,574,602 A | * | 11/1996 | Baca et al. | 360/77.12 |
| 5,617,269 A | * | 4/1997 | Gordenker et al. | 360/77.12 |
| 5,828,514 A | * | 10/1998 | Chliwnyj et al. | 360/77.12 |
| 5,844,814 A | * | 12/1998 | Chliwnyj et al. | 360/77.12 |
| 5,901,008 A | * | 5/1999 | Nayak et al. | 360/78.02 |
| 5,923,494 A | * | 7/1999 | Arisaka et al. | 360/75 |
| 5,946,159 A | * | 8/1999 | Chliwnyj et al. | 360/77.12 |
| 5,956,199 A | * | 9/1999 | Husky et al. | 360/75 |
| 5,999,359 A | * | 12/1999 | Fasen | 360/77.12 |
| 6,462,899 B1 | * | 10/2002 | Chliwnyj et al. | 360/77.12 |
| 6,525,898 B1 | * | 2/2003 | Chliwnyj et al. | 360/77.12 |
| 6,661,600 B1 | * | 12/2003 | Chliwnyj et al. | 360/77.12 |
| 6,674,603 B2 | * | 1/2004 | Basham et al. | 360/77.12 |

* cited by examiner

Primary Examiner—Sinh Tran
Assistant Examiner—James L Habermehl
(74) Attorney, Agent, or Firm—Dale F. Regelman

(57) ABSTRACT

A method to calibrate a servo sensor disposed on a magnetic tape head disposed adjacent a magnetic tape, where that magnetic tape includes at least one servo edge comprising an interface between a first recorded signal and a second recorded signal, whereby the servo sensor is capable of detecting that first recorded signal and that second recorded signal, and whereby an independent position sensor provides an IPS signal comprising the position of the tape head with respect to the tape path. Applicants' method determines and uses initial servo signal information and initial IPS signal information to determine an initial transfer function. That initial transfer function is used to determine a positioning signal where the tape head is alternatingly moved in a first direction and an opposing second direction along a first axis as the tape moves along a tape path such that the position of the magnetic head along the first axis as a function of time comprises a periodic function having the positioning signal. Additional servo signals and additional IPS signals are sampled. Those sampled signals are used to determine a second transfer function.

31 Claims, 11 Drawing Sheets

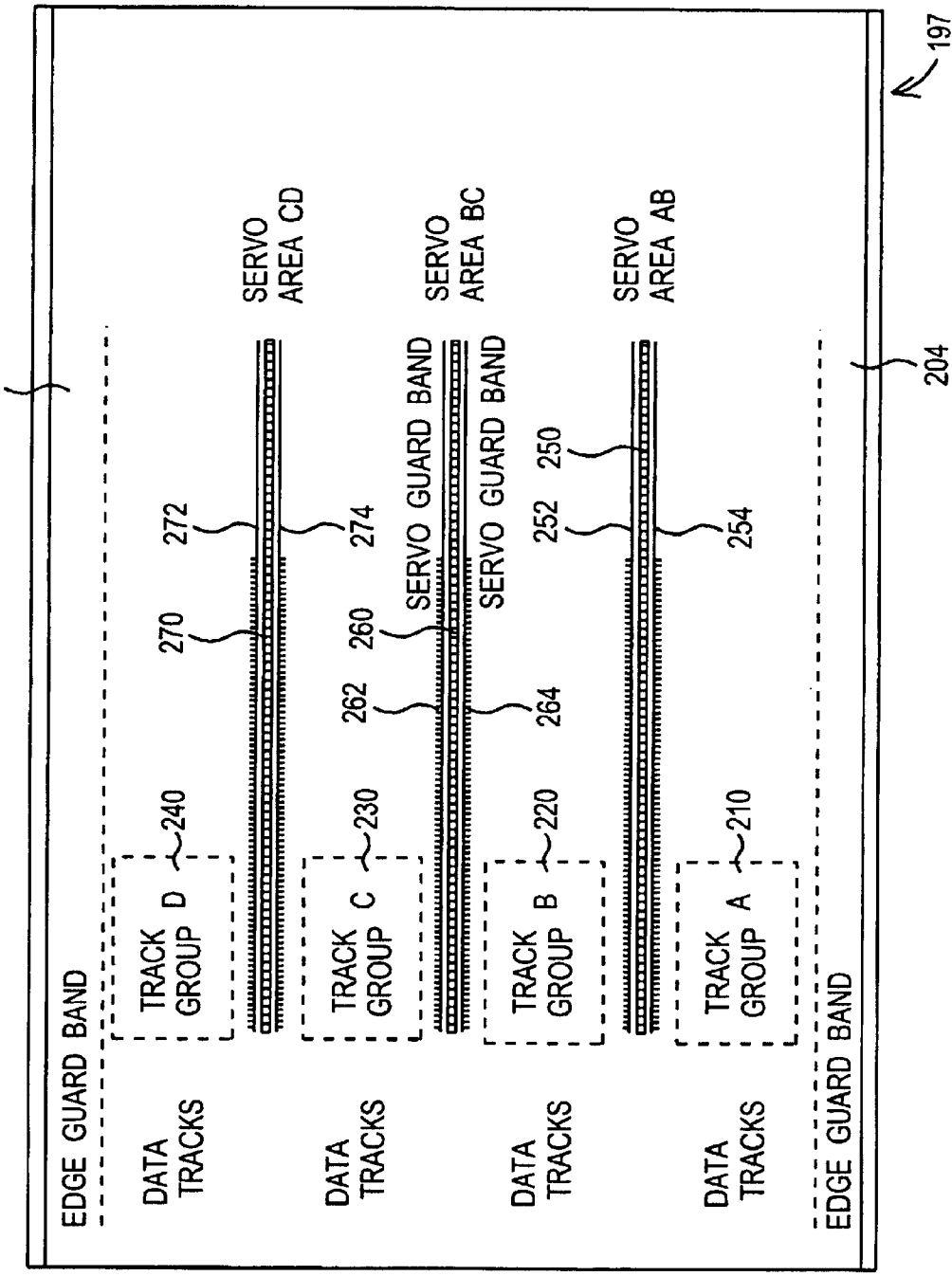

FIG. 2B

| HEAD TRACK NO. | HEAD MODULE L | HEAD MODULE R | | |
|---|---|---|---|---|
| 1 | WR | RD | | |
| 2 | RD | WR | | |
| 3 | WR | RD | | |
| 4 | RD | WR | | |
| 5 | WR | RD | | |
| 6 | RD | WR | | |
| 7 | WR | RD | | |
| 8 | RD | WR | 272 | |
| SERVO | LS1 | RS1 | 274 | 275 |
| SERVO | LS2 | RS2 | 278 | |
| 9 | WR | RD | 276 | |
| 10 | RD | WR | | |
| 11 | WR | RD | | |
| 12 | RD | WR | | |
| 13 | WR | RD | | |
| 14 | RD | WR | | |
| 15 | WR | RD | | |
| 16 | RD | WR | 262 | |
| SERVO | LS3 | RS3 | 264 | 265 |
| SERVO | LS4 | RS4 | 268 | |
| 17 | WR | RD | 266 | |
| 18 | RD | WR | | |
| 19 | WR | RD | | |
| 20 | RD | WR | | |
| 21 | WR | RD | | |
| 22 | RD | WR | | |
| 23 | WR | RD | | |
| 24 | RD | WR | 252 | |
| SERVO | LS5 | RS5 | 254 | 255 |
| SERVO | LS6 | RS6 | 258 | |
| 25 | WR | RD | 256 | |
| 26 | RD | WR | | |
| 27 | WR | RD | | |
| 28 | RD | WR | | |
| 29 | WR | RD | | |
| 30 | RD | WR | | |
| 31 | WR | RD | | |
| 32 | RD | WR | | |

APPARATUS AND METHOD TO CALIBRATE A SERVO SENSOR

FIELD OF THE INVENTION

This invention relates to an apparatus and method to calibrate one or more servo sensors in a "noisy" environment. In certain embodiments, this invention relates to servo track following a moving magnetic tape having one or more servo edges of dissimilar recorded servo signals, and, more particularly, to calibrating one or more servo sensors with respect to one or more indexed servo positions offset laterally from those one or more servo edges.

BACKGROUND OF THE INVENTION

Automated media storage libraries are known for providing cost effective access to large quantities of stored media. Tape cartridges containing a moveable magnetic tape are often used in automated data storage libraries. Tape media, such a magnetic tape, is a common medium for the storage of data to be utilized by a computer. Magnetic tape has found widespread use as a data storage medium because it provides a relatively inexpensive solution for storing large amounts of data.

Magnetic tape data storage typically provides one or more prerecorded servo tracks to allow precise positioning of a tape head with respect to those prerecorded servo tracks. Servo sensors disposed on the tape head are used to track the recorded servo tracks. The tape head comprises one or more read/write elements precisely positioned with respect to those servo sensors. One example of a magnetic tape system is the IBM 3590, which employs magnetic tape having prerecorded servo patterns that include three parallel sets of servo edges, each servo edge being an interface between two dissimilar recorded servo signals, each set of servo edges comprising one servo edge on each of opposite lateral sides of a middle recorded servo signal.

In certain embodiments, the tape head includes a plurality of servo sensors for each servo edge, with the result that the tape head may be stepped between those servo sensors, each positioning the read/write elements at different interleaved groups of data tracks. Typically, for a given servo pattern of a set of two servo edges, the outer servo signals are recorded first, and the center servo signal is recorded last, to provide the servo edges. The nominal separation distance between the servo edges of each set of servo edges is a certain distance, but there is variation in the magnetic separation between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation distance of the prerecorded servo tracks from nominal, the prerecording of the servo tracks is conducted at different amplitudes so as to attempt to compensate for the physical difference and provide a magnetic pattern that is closer to nominal. Thus, the difference in physical distance and the amplitude compensation may tend to offset each other with respect to the apparent distance between the servo tracks. These actions may provide an adequate signal for track following at the servo edges.

However, to increase track density, a servo sensor may be indexed to positions laterally offset from the linear servo edges to provide further interleaved groups of data tracks. The indexed positions are determined by measuring the ratio between the amplitudes of the two dissimilar recorded servo signals. Thus, when the amplitudes of the recorded servo signals are varied to compensate for physical distance variations, track following the prerecorded servo edges at the offset indexed positions becomes less precise. As the result, the data tracks may vary from the desired positions, i.e. be "squeezed" together, such that writing on one track with a write element that is subject to track misregistration (TMR) may cause a data error on the immediately adjacent data track.

The tape path of the above IBM 3590 is a guided tape path. In such a guided tape path embodiment, the magnetic tape can be moved in a first direction and an opposing second direction along a first axis, i.e. along the longitudinal axis of the tape. Movement of that tape along a second axis orthogonal to the first axis, i.e. the lateral axis of the tape, is minimized. Limiting the lateral movement of the magnetic tape results in generating minimal guiding noise, and therefore, the step from a first ratio of servo signals to a second ratio is readily discernible.

Another approach, however, is required for open channel guiding in which the magnetic tape can move laterally a distance which is substantially greater than the separation between index positions, thereby introducing substantial noise into the guiding process. The guiding signal to noise ratio thus becomes negative, with the guiding noise being far larger than the step from one ratio to another, making it difficult to gather data points with a monotonic slope to conduct a calibration of the servo ratios.

SUMMARY OF THE INVENTION

Applicants' invention includes an apparatus and method to calibrate a servo sensor disposed on a magnetic tape head disposed adjacent a magnetic tape moving along a tape path. The magnetic tape includes at least one servo edge comprising an interface between a first recorded signal and a second recorded signal. The servo sensor is capable of detecting that first recorded signal and that second recorded signal. Applicants' apparatus includes an independent position sensor which provides an IPS signal comprising the lateral position of the tape head with respect to the tape path. Applicants' method includes a coarse initial calibration of the servo sensor which is performed before performing the complete calibration.

Applicants' method first positions the tape head while slewing through the servo pattern written to the magnetic tape. By "slewing through the servo pattern" Applicants mean moving the tape head in a substantially linear manner through most or all of the range of motion where meaningful servo signal ratio data exists for a given group servo reader elements. Starting from a position where the servo read elements are entirely off their corresponding servo edges of interest in one direction, i.e. from the outside of the servo pattern, the tape head is smoothly moved to a position where the servo read elements are entirely off their corresponding servo edges of interest in the opposite direction, i.e. toward the center of the servo pattern and the opposite servo edge. In certain embodiments, Applicants' method slews the tape head from a high servo signal ratio to a low servo signal ratio.

Applicants' method provides a servo signal during that tape head positioning, where that servo signal comprises the ratio of the detected first recorded signal and the detected second recorded signal. Using that detected servo signal, Applicants' method generates initial servo signal information. Concurrently, Applicants' method provides an IPS signal during positioning of the magnetic tape head. Using that IPS signal, Applicants' method generates initial IPS signal information. Using the initial servo signal information and the initial IPS signal information, Applicants' method calculates a first transfer function prior to moving the magnetic tape.

Applicants' method includes establishing a maximum allowable residual error $RE_{MAX}$ for the calibration process. After calculating the first transfer function, Applicants' method determines the first residual error for that first transfer function. Applicants' method then compares the first residual error with the maximum allowable residual error. If the first residual error is less than $RE_{MAX}$, then Applicants' method saves the first transfer function for subsequent use. Alternatively, if the first residual error is equal to or greater than $RE_{MAX}$, then Applicants' method uses the first transfer function to calibrate the servo sensor using either known or novel calibration procedures which include moving the magnetic tape.

Applicants' invention further includes an article of manufacture comprising a computer useable medium having computer readable program code disposed therein to calibrate a servo sensor disposed on a tape head disposed adjacent a magnetic tape prior to moving that magnetic tape. Applicants' invention further includes a computer program product usable with a programmable computer processor having computer readable program code embodied therein to calibrate a servo sensor disposed on a tape head disposed adjacent a magnetic tape prior to moving that magnetic tape.

BRIEF DESCRIPTION OF THE DRAWINGS

The invention will be better understood from a reading of the following detailed description taken in conjunction with the drawings in which like reference designators are used to designate like elements, and in which:

FIG. 2A is a diagrammatic illustration of a magnetic tape having three parallel sets of linear servo edges, each servo edge comprising an interface between two dissimilar recorded servo signals;

FIG. 2B is a block diagram showing one embodiment of a magnetic tape head;

DETAILED DESCRIPTION OF THE PREFERRED EMBODIMENTS

This invention is described in preferred embodiments in the following description with reference to the Figures, in which like numbers represent the same or similar elements. The invention will be described as embodied in an apparatus and method to calibrate servo sensors tracking servo signals recorded on a magnetic tape.

Figure 1:
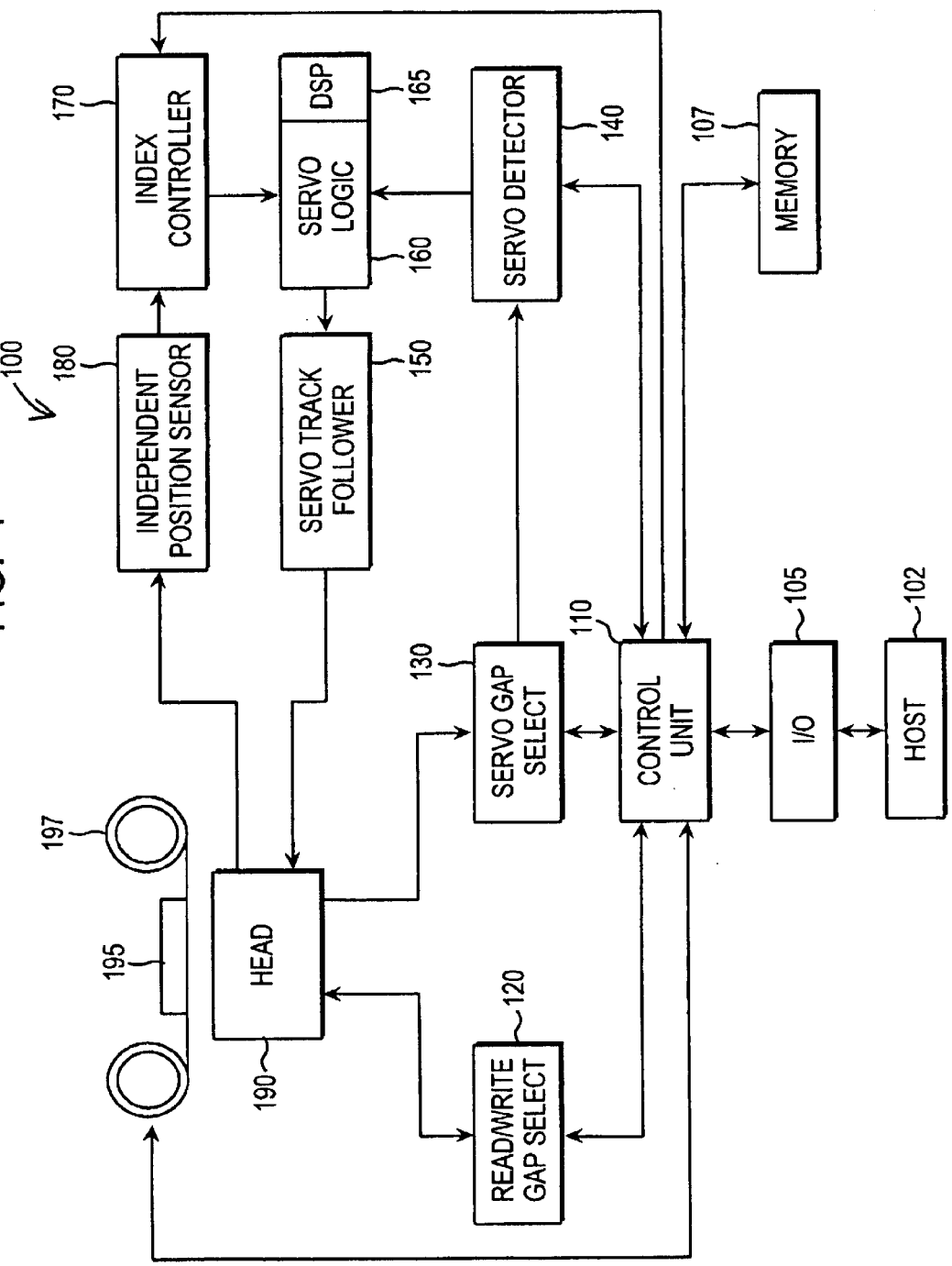
FIG. 1 is a block diagram of an embodiment of a magnetic tape system employing the present invention for calibration of servo index positions.

FIG. 1 shows magnetic tape data storage system 100. Control unit 110 receives and transmits data and control signals to and from a host device 102 via an interface 105. The control unit 110 is coupled to a memory device 107, such as a random access memory for storing information and computer programs. An example of a host device 102 comprises an IBM RS/6000 processor.

A multi-element tape head 190 includes a plurality of read/write elements to record and read information onto and from a magnetic tape 197, and servo sensors to detect servo signals comprising prerecorded linear servo edges on the magnetic tape 197. In certain embodiments, magnetic tape head 190 comprises a thin-film magneto-resistive transducer. In an illustrative embodiment, tape head 190 may be constructed as shown in FIG. 2B. The length of the tape head 190 substantially corresponds to the width of the tape 197. In certain embodiments tape head 190 includes thirty-two read/write element pairs (labeled "RD" and "WR") and three sets of servo read elements (e.g. LS1 272, RS6 298) corresponding to the three servo areas AB (FIG. 2A), BC (FIG. 2A), and CD (FIG. 2A). In the illustrated embodiment, the thirty-two read/write element pairs are divided into groups of eight, adjacent groups being separated by two tracks occupied by a group of four servo sensors. Each group of four servo sensors may be referred to as a "servo group", e.g. servo group 255, servo group 265, and servo group 275.

In the illustrated embodiments, tape head 190 includes left and right modules separately fabricated, then bonded together. Write and read elements alternate transversely down the length of each module (i.e., across the width of the tape), beginning with a write element in position on the left module and a read element in the corresponding position on the right module. Thus, each write element in the left module is paired with a read element in the corresponding position on the right module and each read element in the left module is paired with a write element in the corresponding position on the right module such that write/read element pairs alternate transversely with read/write element pairs.

A tape reel motor system (not shown in FIG. 1) moves the tape 197 along a tape path 195 in a first direction, and optionally in an opposing second direction, along a first axis, i.e. the longitudinal axis of the tape, while it is supported by a tape deck for reading and writing. The tape deck does not precisely hold the tape in position laterally. Rather, open channel guiding may be employed in which the magnetic tape can move laterally a distance which is substantially greater than that between index positions, thereby introducing substantial guiding noise into the calibration process. The guiding signal to noise ratio thus becomes negative, with the guiding noise being far larger than the step from one ratio to another, making it difficult to gather data points with a monotonically increasing or decreasing slope to conduct a calibration of the detected servo signal ratios.

A servo track follower 150 directs the motion of the magnetic tape head 190 in a lateral or transverse direction relative to the longitudinal direction of tape motion. The control unit 110 is coupled to one or more tape reel motors and controls the direction, velocity and acceleration of the tape 197 in the longitudinal direction.

The data tracks on the tape 197 are arranged in parallel and are parallel to the linear servo edges. Thus, as the servo track follower 150 causes the servo sensors of the magnetic tape head to track follow a linear servo edge or a servo index position laterally offset from a servo edge, the read/write elements track a parallel group of the data tracks. If it is desired to track another parallel group of data tracks, the magnetic tape head 190 is indexed laterally to another servo edge or to another servo index position, or a different servo sensor is aligned with the same or a different servo edge or servo index position.

When the magnetic tape head 190 is to be moved to a selected index position, an index controller 170 is enabled by the control unit 110, receiving a lateral position signal from an independent position sensor 180 and transmits an appropriate signal to servo logic 160 to select the appropriate servo track, while the control unit 110 transmits an appropriate signal to a servo gap selector 130 to select the appropriate servo sensor. The independent position sensor 180 is discussed in the incorporated U.S. Pat. No. 5,9316,159, where it is called a non-servo position sensor, and indicates the lateral mechanical position of the tape head 190 with respect to the tape path 195.

Over the course of longer distances of longitudinal tape movement, the open channel guiding system will allow the tape to move laterally with respect to the tape deck. In accordance with the present invention, the independent position sensor 180, in limited distances of tape movement, accurately tracks the lateral mechanical position of the tape head 190, and therefore of the servo sensor(s), with respect to the magnetic tape 197 and of the servo edges. The logic 160 operates the servo track follower 150 in accordance with the present invention to calibrate the servo index positions as sensed by the servo sensor with respect to the parallel sets of linear servo edges, as will be explained. The logic 160 may comprise a programmed PROM, ASIC or microprocessor.

The tape system 100 may be bidirectional, in which ones of the read/write elements are selected for one direction of longitudinal tape movement, and others of the read/write elements are selected for the opposite direction of movement. The control unit 110 additionally selects the appropriate ones of the read/write elements by transmitting a signal to a read/write gap select unit 120.

Once a servo edge or edges are selected, the servo gap selector 130 provides the servo signals to a servo detector 140, which information is employed by servo logic 160 to position the tape head 190 to track follow the detected edges. In accordance with the present invention, servo logic 160 employs the servo information sensed by the servo detector 140 and the mechanical positioning information from the independent position sensor 180 to calibrate the track following servo. The track following servo logic is also implemented in the servo logic 160 employing the sensed servo signals to determine the ratios of the sensed servo signals, which are employed in accordance with the present invention to calibrate the servo index positions of the track following servo 150.

Referring to FIG. 2A, a plurality, for example, three, parallel sets of linear servo edges 250, 260 and 270 are illustrated, each servo edge comprising an interface between two dissimilar recorded servo signals, each set of servo edges comprising one of the servo edges on each of opposite lateral sides of a middle recorded servo signal. As an example, a corresponding plurality of laterally offset servo sensors, i.e. servo sensor groups 255 (FIG. 2B), 265 (FIG. 2B), 275 (FIG. 2B), are disposed on tape head 190 to sense the servo signals at each corresponding edge. Additional pluralities of servo sensors, i.e. sensors 272, 274, 276, 278, may be provided to allow positioning of the tape head at additional data tracks.

Figure 3A:
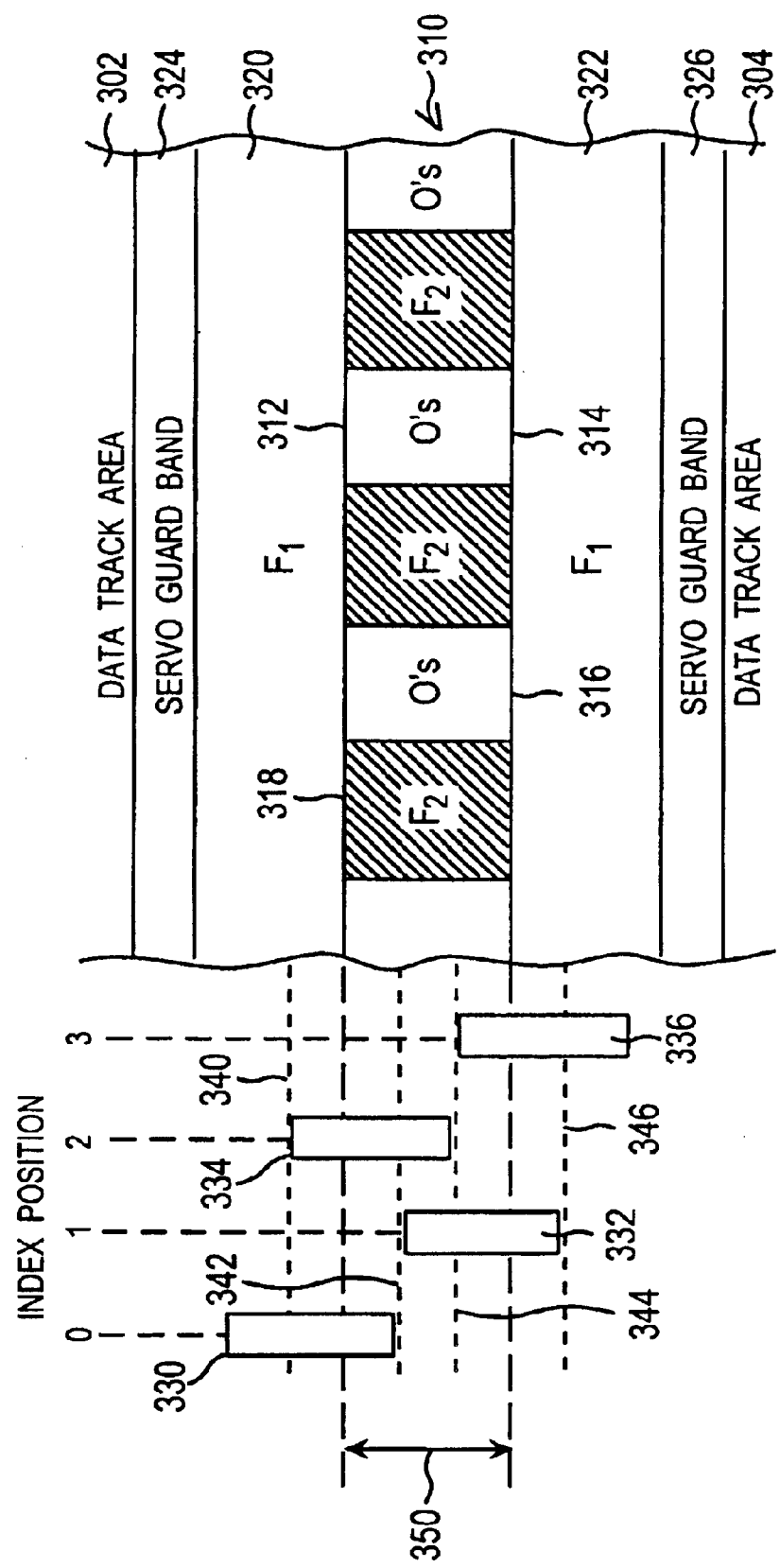
FIG. 3A is a detailed diagrammatic representation of a magnetic tape format providing four servo index positions in one set of two linear servo edges of the magnetic tape of FIG. 2A.

Referring to FIG. 3A, the typical magnetic tape format of servo signals to form linear servo edges 312 and 314 comprising an interface between two dissimilar recorded servo signals is illustrated. One set of servo edges comprises outer bands 320 and 322, having a recorded pattern of a constant amplitude signal of a single first frequency, on either side of an inner band 310 of the other servo signal, having a recorded pattern alternating between a constant amplitude burst signal 318 of a single second frequency and a zero amplitude null signal 316. Typically, the servo signals 320, 310 and 322 are provided with servo guard bands 324 and 326 to protect the outer bands 320 and 322 from noise resulting from the data track areas 302 and 304.

It is desirable that the servo edges are separated by a predetermined nominal distance 350 employed for prerecording the servo signals. Typically, the outer servo signals 320, 322 are recorded first, and the center servo signal 310 is recorded last, to provide the servo edges 312, 314. There is, typically, variation in the magnetic separation 350 between the servo edges, for example, due to the variation of the width of the physical write element which prerecords the servo pattern, due to variation in the magnetic characteristics of the physical write element, etc. The variation may occur between servo tracks in a single magnetic tape, and may occur between prerecording devices and therefore between magnetic tapes.

To reduce the apparent difference of the edge separation 350 distance of the prerecorded servo tracks from nominal, the prerecording of the servo signals is conducted at different amplitudes so as to attempt to compensate for the physical difference and provide a magnetic pattern that is closer to nominal. Additionally, three servo sensors are employed to simultaneously sense the three servo tracks. Thus, the difference in physical distance and the amplitude compensation may tend to offset each other with respect to the resultant apparent distance between the servo tracks. These actions may provide an adequate signal for track following at the servo edges.

However, to increase data track density, in the embodiment of FIG. 3A four servo index positions, i.e. index positions 0, 1, 2, and 3, are calibrated. These index positions are laterally offset with respect to the sensed servo edges of the set of linear servo edges. Index position 0 corresponds to sensor placement 330 over tape track position 340. Similarly, index positions 1, 2, and 3, respectively, correspond to sensor placements 332, 334, and 336, respectively, over tape track positions 342, 344, and 346, respectively. The relative positions of these four index positions are: 0, 2, 1, 3.

As an example, the servo index positions may be offset laterally about one quarter the width of the inner band 310 away from the servo edge in either direction, providing four index positions. The indexed positions are determined by measuring the ratios between the amplitudes of the two dissimilar recorded servo signals, e.g., as measured by the servo detector 140 of FIG. 1, and mapping those ratios into physical distances in microns. The servo logic 160 operates the servo track follower 150 to track follow at the desired measured ratio. For example, the measured ratio will be the ratio between the sum of the sensed outer band signal 320 plus the inner band signal 318, and the sensed outer band signal 320, giving effect to the null 316. The illustrations and descriptions herein employ this ratio.

Alternatively, the measured ratio may be the ratio between the outer band signal 320 at frequency F1 and the inner band signal 318 at frequency F2. In order to center the data read/write elements at each of the servo index positions, the ratios must be measured precisely. Thus, when the amplitudes of the recorded servo signals are varied to compensate for physical distance variations, the measured ratios are distorted and track following the prerecorded servo edges at the offset indexed positions becomes less precise. As the result, the data tracks may vary from the desired positions, for example, squeezed together, such that writing on one track with a write element that is subject to track misregistration (TMR) may cause a data error on the immediately adjacent data track.

Figure 3B:
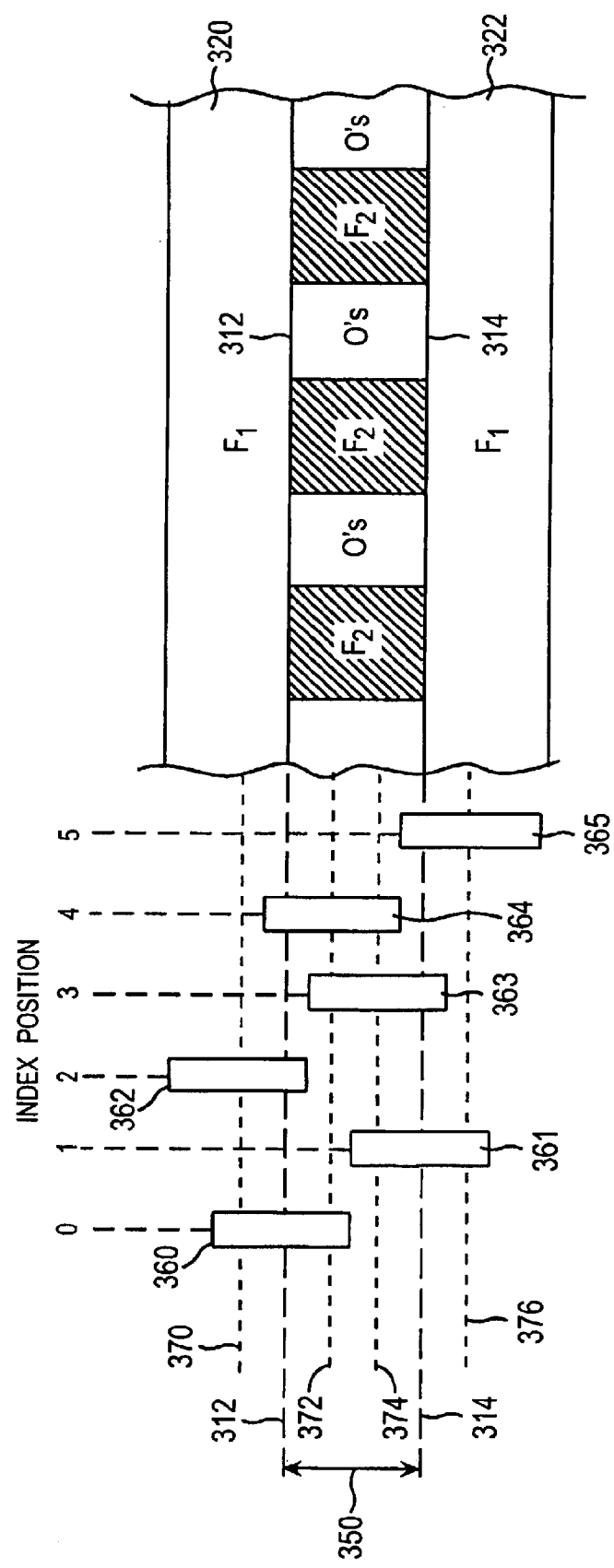
FIG. 3B is a detailed diagrammatic representation of a magnetic tape format providing six servo index positions in one set of two linear servo edges of the magnetic tape of FIG. 2A.

FIG. 3B illustrates another embodiment of displaced index positions that may be employed with the present invention. This embodiment includes six index positions, i.e. index positions 0, 1, 2, 3, 4, and 5. At the "0" or "1" index positions, the servo element is located at position 360 centered on servo edge 312 or at position 361 centered on servo edge 314. Additional index positions are provided which are aligned such that a servo element is displaced from an edge 312 or 314 in either direction. As the result, the number of index positions becomes six. The relative positions of these six index positions are: 2, 0, 4, 3, 1, 5.

In order to center the data read/write elements in the "2" and "5" index positions, the servo read element must be located at position 362 or at position 365, and will read a minimum signal that has an amplitude ratio of about 5/6 of the maximum signal, and to center the data read/write elements in the "3" and "4" index positions, the servo read element must be located at position 363 or at position 364, and will read a minimum signal that has an amplitude ratio of about 1/6 of the maximum signal.

To track follow an edge or edges, once a servo edge or edges are selected, the servo gap selector 130 of FIG. 1 provides the servo signals to a servo detector 140, which digitally detects the servo signals at a predetermined sample rate, and provides servo signal ratios of each of the selected servo sensors. The servo logic 160 employs the servo signal ratios to determine the displacement from the edges and operates the servo loop servo track follower 150 to position the tape head 190 to track follow at the desired displacement from the edges.

Figure 4A:
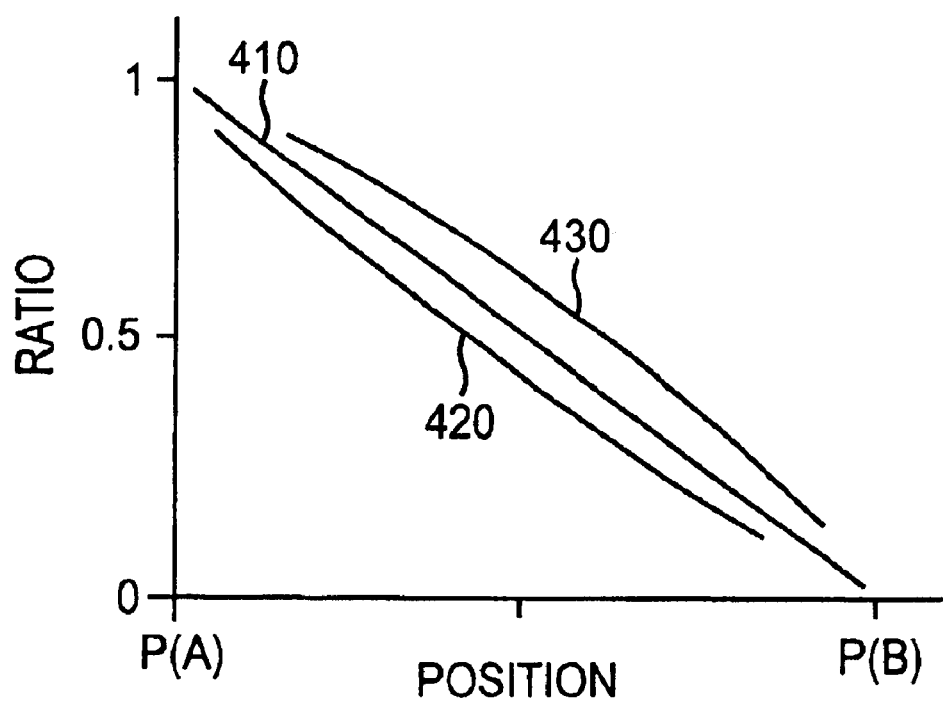
FIG. 4A is a diagrammatic representation of the relationships between ratios of the sensed servo signals of a servo edge of FIG. 2A and their corresponding lateral positions, where the recorded servo signals generating the edge are of three different amplitudes.

FIG. 4A illustrates examples of distortion of the measured ratios between the sensed servo signals of one linear servo edge, at various lateral positions of the servo sensors, in a guided tape system. Referring additionally to FIGS. 3A and 3B regarding servo sensor placement, in an ideal relationship, the ratio of signals varies linearly from a value of "1" when the servo sensor is at position $P_{(A)}$, which is centered on and senses only the outer band 320 or outer band 322, to a value of "0" when the servo sensor is at position $P_{(B)}$, which is centered on and senses only the inner band 310. Straight line 410 graphically illustrates such an ideal relationship.

Figure 4B:
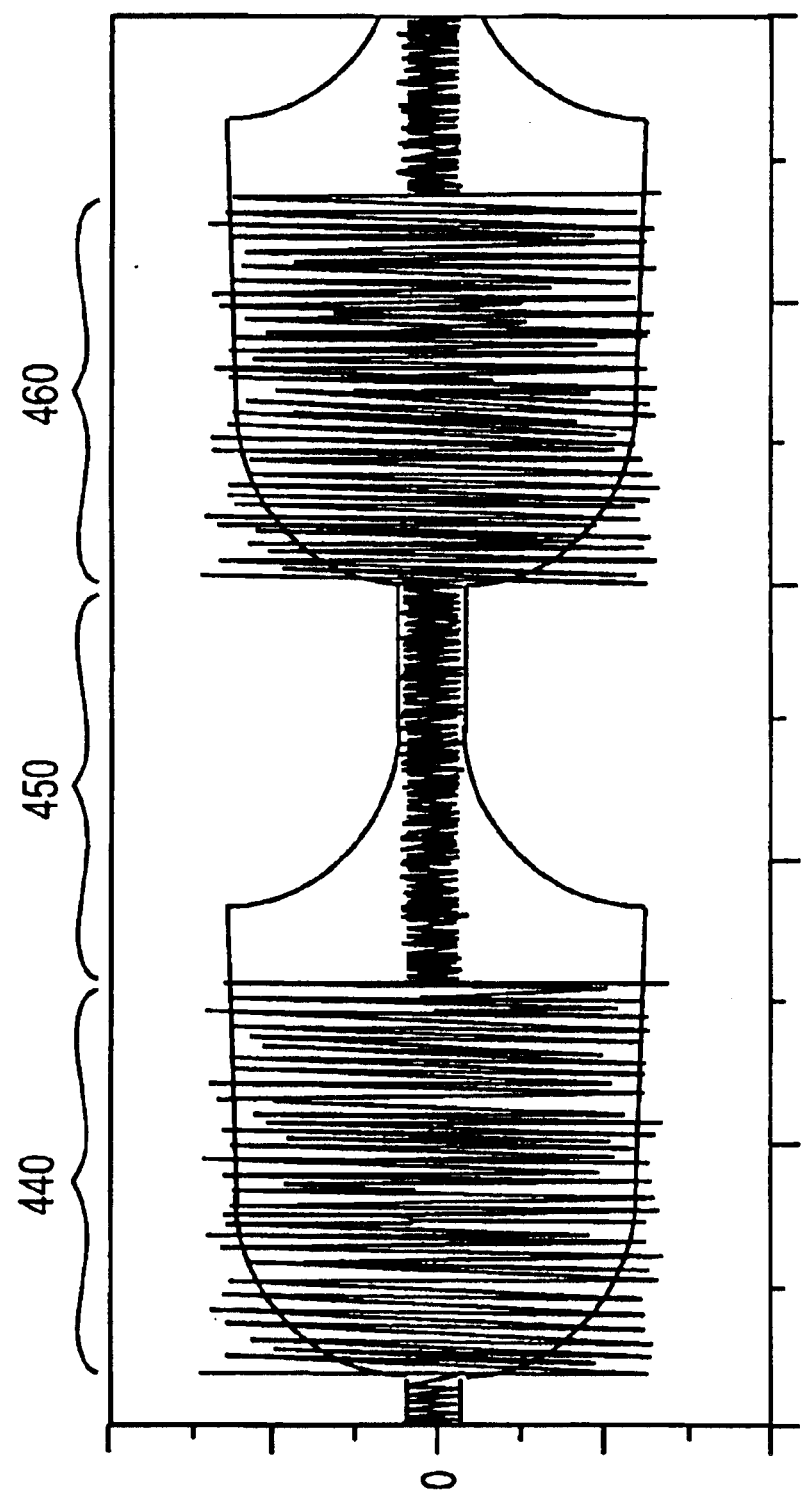
FIG. 4B shows analog servo signals detected at a first index position.
Figure 4C:
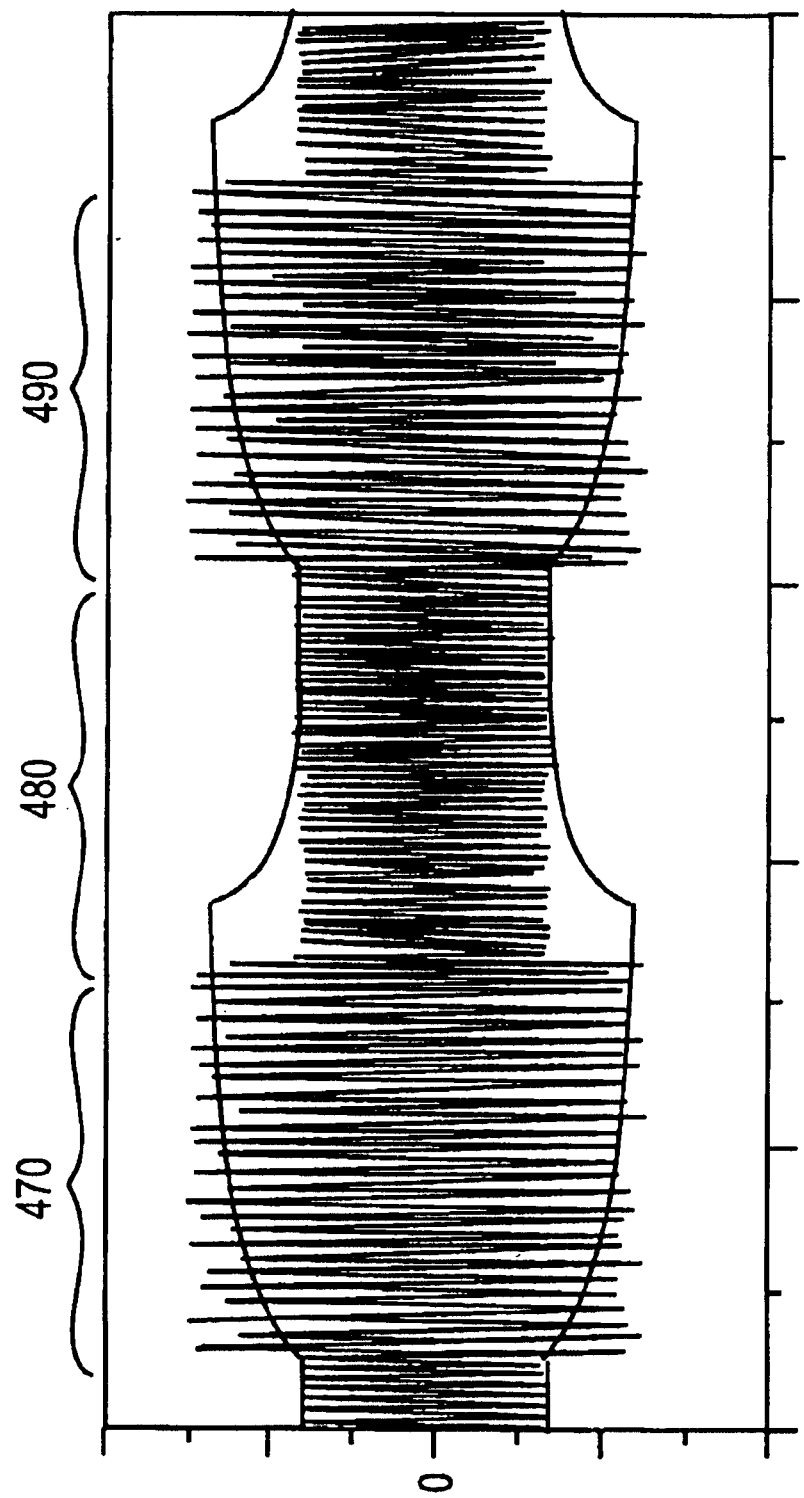
FIG. 4C shows analog servo signals detected at a second index position.

Curve 420 comprises a graphical representation of more typical ratio of servo signals, measured in a guided system, where the center recorded servo signal 310 generating the edges is of a relatively weak amplitude. FIGS. 4B and 4C illustrate wave forms of the analog signal from the servo transducer at, respectively, positions 332 and 336 of FIG. 3A. Thus, in FIG. 4B, the bursts 440 and 460 formed while the servo transducer is at position 332 of FIG. 3A from the combination of the first frequency and the second frequency burst is at a high amplitude, but the burst 450 formed from the combination of the first frequency and the null signal is at a very low amplitude because only a small portion of the servo transducer is positioned over the first frequency. In FIG. 4C, the bursts 470 and 490 formed while the servo transducer is at position 336 of FIG. 3A from the combination of the first frequency and the second frequency burst is at a high amplitude, as is the burst 480 formed from the combination of the first frequency and the null signal, because the servo transducer is positioned primarily over the first frequency.

Referring again to FIG. 4A, curve 430 comprises a graphical representation of more typical ratio of servo signals as a function of servo sensor location, measured in a guided system, where the center recorded servo signal 310 generating the edges is of a relatively strong amplitude. As those skilled in the art will appreciate, curves 420 and 430 do not define linear relationships between the ratios of measured servo signals and servo sensor placement. In light of the differing, and complex, relationship between the ratio of measured servo signals as a function of servo sensor location, employing the same ratio setting to position the tape head at various servo index positions for each of the linear edges may result in track misregistration.

Figure 5:
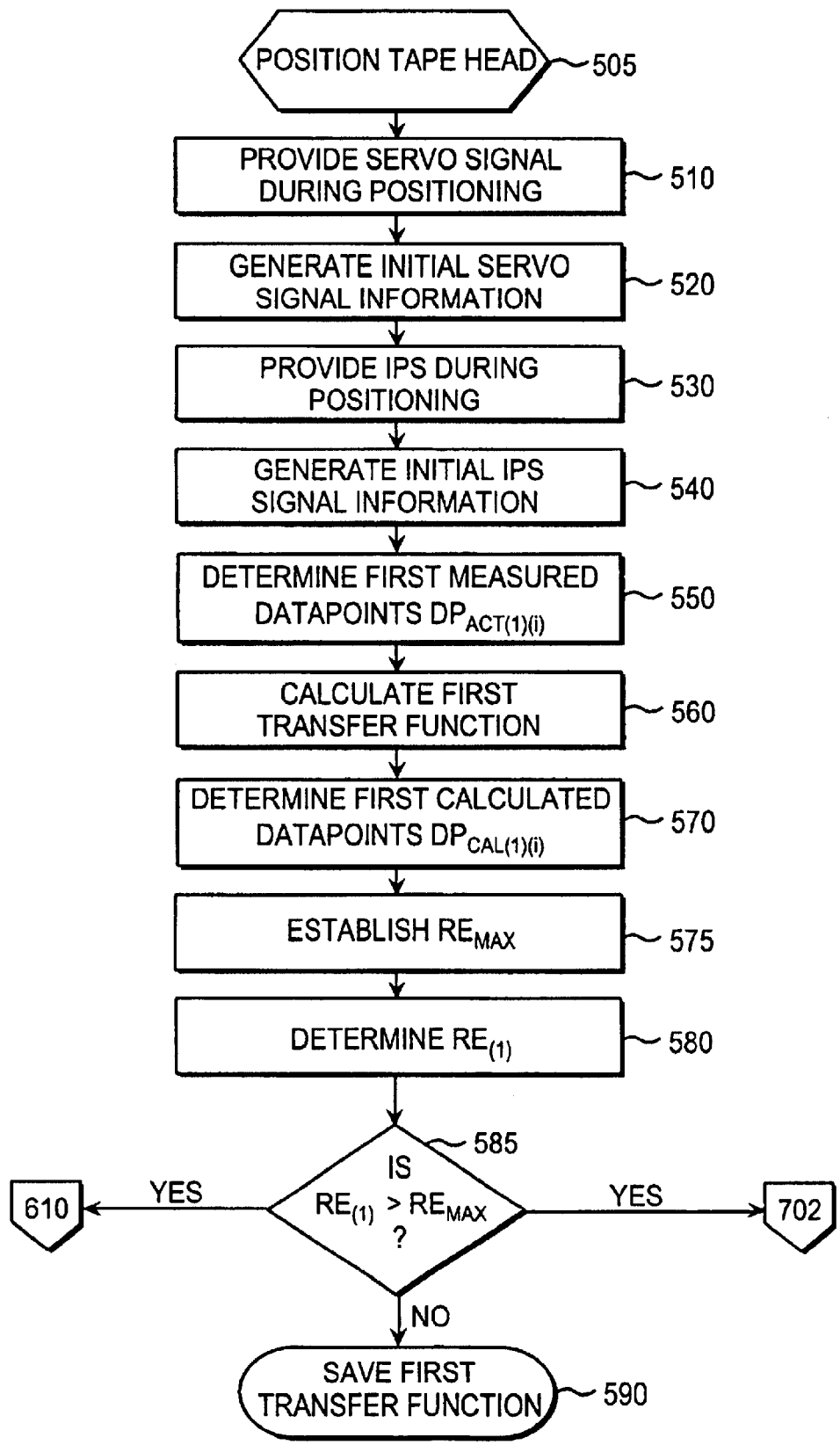
FIG. 5 is a flow chart summarizing the initials steps of Applicants' method.

Referring now to FIG. 5, Applicants' method to calibrate one or more servo sensors begins at step 505. In step 505, the tape head, such as tape head 190 (FIG. 1), is positioned adjacent the magnetic tape, such as tape 197 (FIG. 1). In certain embodiments, the positioning of step 505 includes moving the tape head laterally with respect to the magnetic tape. In certain embodiments, step 505 is performed by servo logic, such as logic 160 (FIG. 1).

During the initial tape head positioning of step 505, the servo sensor to be calibrated detects in step 510 the recorded servo frequencies and provides during the initial positioning of the tape head an analog signal to a servo detector, such as servo detector 140 (FIG. 1). In step 520, Applicants' method provides a servo signal comprising the ratio of the detected first recorded frequency and the detected second recorded frequency. In certain embodiments, step 520 is performed by a servo detector, such as servo detector. In certain embodiments, the servo detector provides the servo signal to the servo logic, such as logic 160 (FIG. 1).

In step 530, an IPS sensor, such as IPS sensor 180 (FIG. 1), provides during the initial positioning of the tape head an analog IPS signal representing the position of the tape head with respect to the tape path. In certain embodiments, the IPS signal of step 530 is provided to servo logic, such as logic 160. In step 540, Applicants' method generates initial IPS signal information. In certain embodiments, step 540 is performed by servo logic, such as logic 160. Steps 505, 510, 520, 530, and 540, are performed substantially simultaneously, i.e. as the tape head is moved into position to begin the sensor calibration.

In step 550, Applicants' method uses the initial servo signal information of step 520 and the initial IPS signal information of step 530 to form an array of actual datapoints, $DP_{ACT(1)(i)}$. Applicants' method transitions from step 550 to step 560 wherein Applicants' method calculates an initial transfer function using the datapoint array of step 550. In certain embodiments, step 560 includes using an (n)th order curve fitting algorithm, wherein (n) is greater than or equal to 1 and less than or equal to about 6. In certain embodiments, step 560 is performed by servo logic, such as logic 160. A transfer function mathematically expresses the position of the tape head with respect to the tape path as a function of the ratio of the detected first recorded servo frequency and the detected second recorded servo frequency.

Applicants' method transitions from step 560 to step 570 wherein Applicants' method determines a plurality of first calculated datapoints $DP_{CAL(1)(i)}$ using the first transfer function of step 560. In certain embodiments, step 570 is performed by servo logic, such as logic 160.

As those skilled in the art will appreciate, the purpose of servo sensor calibration is to generate expected position error signals ("PES"). Such an expected PES is subsequently used to "track follow," i.e. to track a servo pattern during, for example, a read/write/erase operation using a specified index position.

In order to evaluate the usefulness of the first transfer function formed in step 560 for subsequent use in track following, Applicants' method compares the measured datapoints of step 550 with the calculated datapoints of step 570. Applicants' method transitions from step 570 to step 575 wherein Applicants' method establishes a maximum allowable residual error, $RE_{MAX}$, between the measured and calculated datapoints. In certain embodiments, the value of $RE_{MAX}$ is set in firmware disposed in logic 160 (FIG. 1). In certain embodiments, the value of $RE_{MAX}$ is set by Applicants' method based upon, for example, the electrical noise present in the servo loop system. In certain embodiments, the value of $RE_{MAX}$ is set upon system initialization by field service personnel. In certain embodiments, the value of $RE_{MAX}$ is provided by an attached host computer.

Applicants' method transitions from step 575 to step 580 wherein Applicants' method determines the residual error component $RE_{(1)}$ of the first transfer function by comparing measured datapoints $DP_{ACT(1)(i)}$ with calculated datapoints $DP_{CAL(1)(i)}$. Applicants' method determines a residual error $RE_{(1)(i)}$ for each measured/calculated datapoint pair, wherein $RE_{(1)(i)} = DP_{ACT(1)(i)} - DP_{CAL(1)(i)}$. Applicants' method averages the values of $RE_{(1)(i)}$ to form $RE_{(1)}$.

Applicants' method transitions from step 580 to step 585 wherein Applicants' method determines if $RE_{(1)}$ exceeds $RE_{MAX}$. If $RE_{(1)}$ does not exceed $RE_{MAX}$, then the first transfer function of step 560 is saved in step 590 for subsequent use. In certain embodiments, the first transfer function is saved in a memory component of the servo system, such as memory 107 (FIG. 1).

If Applicants' method determines that the first transfer function of step 560 is not accurate enough for subsequent tape tracking, i.e. that $RE_{(1)}$ is too large, that first transfer function is nevertheless used to determine a positioning signal used subsequently in Applicants' calibration procedure. In certain embodiments, if Applicants' method determines in step 585 that $RE_{(1)}$ exceeds $RE_{MAX}$, then Applicants' method transitions from step 585 to step 610 (FIG. 6) In certain embodiments, if Applicants' method determines in step 585 that $RE_{(1)}$ exceeds $RE_{MAX}$, then Applicants' method transitions from step 585 to step 702 (FIG. 7).

Figure 6:
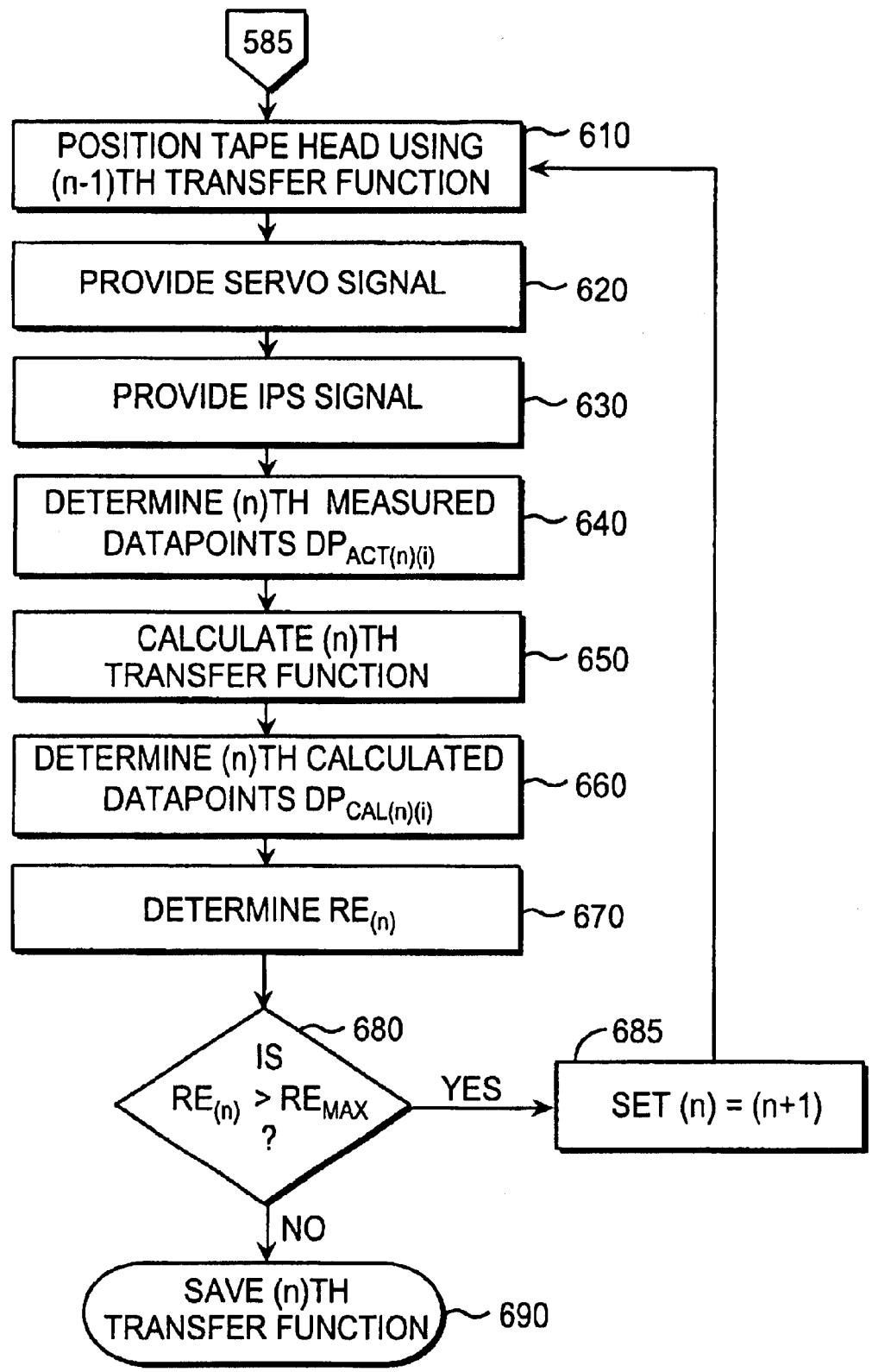
FIG. 6 is a flow chart summarizing certain additional steps in a first embodiment of Applicants' method.
Figure 7:
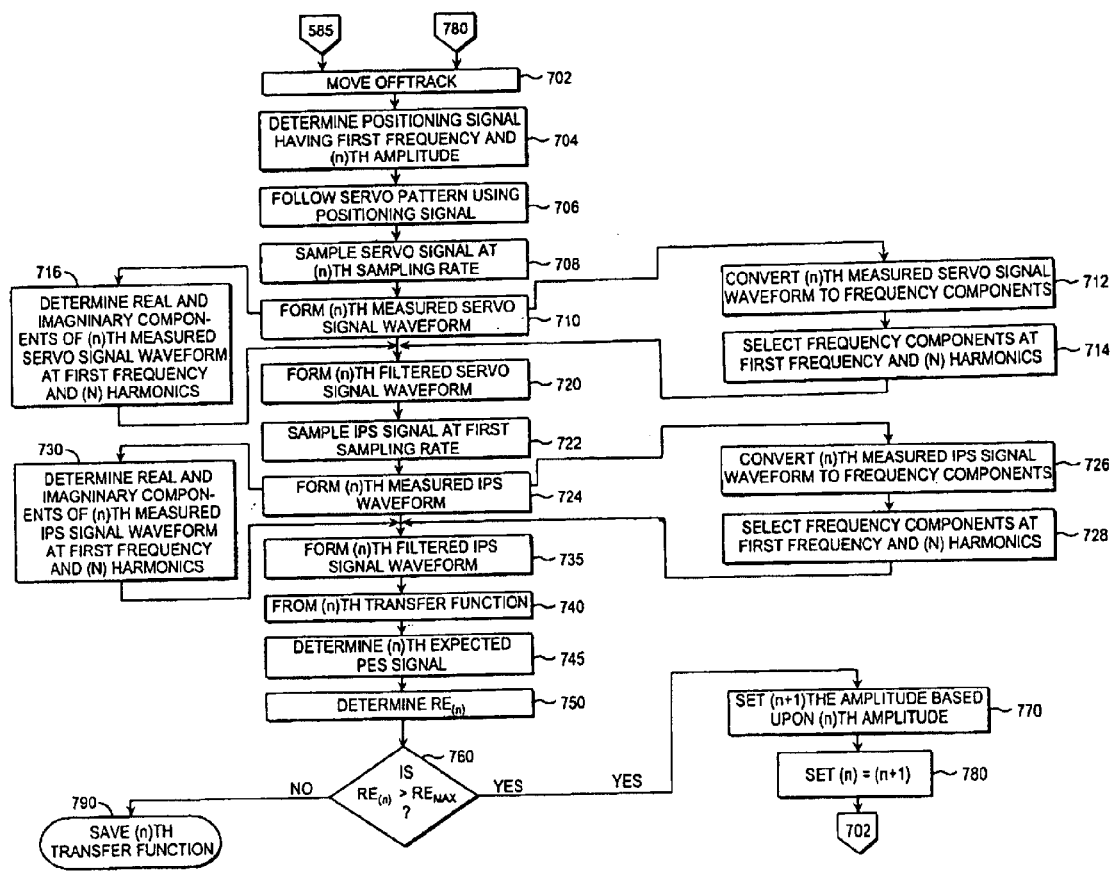
FIG. 7 is a flow chart summarizing certain additional steps in a second embodiment of Applicants' method.

FIG. 6 summarizes the steps of Applicants' method to perform the (n)th calibration of a servo sensor, i.e. generate the (n)th transfer function, using the (n−1)th transfer function. Referring now to FIG. 6, in step 610 Applicants' method positions the tape head, such as tape head 190 (FIG. 1), using the previously determined transfer function, i.e. the (n−1)th transfer function. Further in step 610, Applicants' method causes the tape to move in a first direction. In certain embodiments, step 610 is formed by servo logic, such as logic 160 (FIG. 1).

In steps 620, 630, and 640, Applicants' method continues to calibrate the servo sensor using either known or novel calibration methods. In certain embodiments, steps 620, 630, and 640, are performed by servo logic, such as logic 160. Various methods are known in the art to accomplish such a calibration. For example, U.S. Pat. No. 5,629,813, assigned to the common assignee hereof, and incorporated by reference herein, teaches a method to calibrate a servo sensor. In certain embodiments of the instant Application, steps 620, 630, and 640, include moving the magnetic tape, detecting servo signal ratios, and measuring IPS signals. That servo signal ratio data and the IPS signal data are used to form the (n)th transfer function in step 650.

Pending Application having Patent Application Publication Number 2003/0128457, assigned to the common assignee hereof and hereby incorporated herein, teaches a novel method to calibrate a servo sensor. In certain embodiments of the instant Application, steps 620, 630, and 640, include moving the magnetic tape, detecting servo signal ratios in combination with independent sensor signals, and forming digital waveforms therefrom. Those digital waveforms are filtered using Fast Fourier Transform/Inverse Fast Fourier Transform algorithms. Those filtered waveforms are then used to form the (n)th transfer function in step 650.

Pending Application entitled Method And Apparatus To Calibrate one or more Transducers In A Noisy Environment, Ser. No. 10/185125, filed on Jun. 27, 2002, assigned to the common assignee hereof and hereby incorporated herein, teaches a novel method to calibrate a tape drive. In certain embodiments of the instant Application, steps 620, 630, and 640, include moving the magnetic tape, detecting servo signal ratios in combination with independent sensor signals, and forming digital measured waveforms therefrom. Those digital measured waveforms are filtered using the real and imaginary components of those waveforms at selected frequencies. Those filtered waveforms are then used to form the (n)th transfer function in step 650.

Applicants' method transitions from step 650 to step 660 wherein Applicants' method determines a plurality of (n)th calculated datapoints $DP_{CAL(n)(i)}$ using the (n)th transfer function of step 650. In certain embodiments, step 660 is performed by servo logic, such as logic 160.

Applicants' method transitions from step 660 to step 670 wherein Applicants' method determines the residual error component $RE_{(n)}$ of the (n)th transfer function by comparing measured datapoints $DP_{ACT(n)(i)}$ with calculated datapoints $DP_{CAL(n)(i)}$. Applicants' method determines a residual error $RE_{(n)(i)}$ for each measured/calculated datapoint pair, wherein $RE_{(n)(i)} = DP_{ACT(n)(i)} - DP_{CAL(n)(i)}$. Applicants' method averages the values of $RE_{(n)(i)}$ to form $RE_{(n)}$. In certain embodiments, step 670 is performed by servo logic, such as logic 160.

Applicants' method transitions from step 670 to step 580 wherein Applicants' method determines if $RE_{(n)}$ exceeds $RE_{MAX}$. If $RE_{(n)}$ does not exceed $RE_{MAX}$, then the (n)th transfer function of step 650 is saved in step 690 for subsequent use. In certain embodiments, the (n)th transfer function is saved in a memory component of the servo system, such as memory 107 (FIG. 1).

If Applicants' method determines that the (n)th transfer function of step 650 is not accurate enough for subsequent tape tracking, i.e. that $RE_{(n)}$ is too large, that (n)th transfer function is nevertheless used to determine the tape head position when forming the (n+1)th transfer function. If Applicants' method determines in step 680 that $RE_{(n)}$ exceeds $RE_{MAX}$, then Applicants' method transitions from step 680 to step 685 wherein (n) is incremented. Applicants' method transitions from step 685 to step 610 wherein Applicants' calibration procedure continues.

Referring again to FIG. 5, in certain embodiments if Applicants' method determines in step 585 that $RE_{(1)}$ exceeds $RE_{(MAX)}$, then Applicants' method transitions from step 585 to step 702. Referring now to FIG. 7, in step 702 Applicants' method causes the tape head to move such that the servo sensor is not aligned with a servo edge. In certain embodiments, step 702 is performed by servo logic, such as logic 160. In step 704, Applicants' method establishes a positioning signal to use in servo sensor calibration. The positioning signal of step 704 includes a positioning signal frequency and the (n)th positioning signal amplitude. The transfer function of step 560 (FIG. 5) is used to establish the positioning signal of step 704.

In step 706, Applicants' method operates the servo loop to move in the direction of the servo pattern, such as pattern 250 (FIG. 2A), 260 (FIG. 2A), or 270 (FIG. 2A), to be calibrated, in order to find and lock to the pattern as the magnetic tape moves along the tape path. In certain embodiments, step 706 is performed by logic 160. In certain embodiments, step 706 further includes determining whether the servo pattern has been found. In these embodiments, if Applicants' method determines in step 706 that the servo pattern has not been found, then Applicants' method transitions from step 706 to step 702 to repeat the movement off-track.

Alternatively, if Applicants' method determines in step 706 that the servo pattern has been located, Applicants' method transitions from step 706 to step 708 wherein Applicants' method causes the servo loop to laterally position the servo sensor to detect the servo signals at continually altered digital set points of the ratios of the sensed servo signals. In certain embodiments, step 708 is performed by logic 160. The set points are altered at the sample rate of the servo loop, and are altered to inject the positioning signal of step 704, whereby the servo loop track follows the linear servo edges, e.g., edges 312 or 314 of FIGS. 3A and 3B at each of the parallel sets of linear servo edges 250 (FIG. 2A), 260 (FIG. 2A), 270 (FIG. 2A), with the corresponding plurality of laterally offset servo sensors, i.e. sensor groups 255 (FIG. 2B), 265 (FIG. 2B), 275 (FIG. 2B), at the continually altered digital set points.

In certain embodiments, this predetermined positioning signal comprises a sinusoidal pattern having a known first positioning signal frequency and the (n)th positioning signal amplitude. In certain embodiments, the positioning signal is recorded in firmware disposed in logic 160. In certain embodiments, the positioning signal comprises a sinusoidal pattern having a varying frequency. In certain embodiments, the positioning signal is varied according to an algorithm disposed in logic 160. The positioning signal of step 704 is formed using the first transfer function determined in step 560 (FIG. 5).

In certain embodiments, the first positioning signal frequency is set in "firmware" disposed in DSP 165. In certain embodiments, the first positioning signal frequency is set by the user during system initialization. In certain embodiments, the first positioning signal frequency is set by field service personnel during system initialization. In certain embodiments, the first positioning signal frequency is modified by Applicants' method in order to further refine the calibration of the servo sensors disposed in the system.

The positioning signal of step 704 comprises a first positioning signal frequency selected such that the first positioning signal frequency, and major harmonics thereof, each differs from intrinsic operational frequencies of the track following servo system and/or of the tape drive. As examples, the positioning signal is selected so that the first positioning signal frequency and major harmonics thereof differ from the frequencies of the tape reels 197 of FIG. 1, the tape motor(s), and the cooling, fans, and any resonant frequencies of the servo system.

In certain embodiments, the positioning signal is modulated such that the ratio of sensed servo signals, i.e. the ratio of the detected amplitudes of F1 and F2, varies from a ratio of about 0.1 to a ratio of about 0.9. The servo signals detected is dominated by the sinusoidal pattern and not by the tape movement. The frequency of the positioning signal, i.e. the first positioning signal frequency, is known precisely, and signals not having that first positioning signal frequency, or harmonics of that first positioning signal frequency, comprise noise in the measurement.

Applicants' method transitions from step 706 to step 708 wherein Applicants' method samples the servo signal provided by the servo detector at the (n)th sampling rate. In certain embodiments, step 708 is performed by servo logic, such as logic 160. Applicants' method transitions from step 708 to step 710 wherein the data collected in step 708 is used to form the (n)th measured servo signal waveform. In certain embodiments, step 710 is performed by servo logic, such as logic 160. The digitized measured servo signal waveform of step 710 is dominated by the sinusoidal pattern having the first positioning signal frequency, and not by the tape movement. The frequency of the first positioning signal frequency is known precisely, and anything that is not at that first positioning signal frequency, or its harmonics, comprises noise in the measurement.

Applicants' method transitions from step 710 to step 720 wherein Applicants' method forms the (n)th filtered servo signal waveform using the (n)th measured servo signal waveform of step 710. In certain embodiments, step 720 is performed by servo logic, such as logic 160.

In certain embodiments, Applicants' method transitions from step 710 to step 712 wherein the (n)th measured servo signal waveform is converted into a plurality of frequency components. In certain embodiments, step 712 is performed by servo logic, such as logic 160. In certain embodiments, step 712 includes using Fast Fourier transforms. Applicants' method transitions from step 712 to step 714 wherein Applicants' method selects from the frequency components of step 712 the frequency components at (P) harmonics of the first positioning signal frequency, wherein (P) is equal to or greater than 1 and less than or equal to about 6. In certain embodiments, step 714 is performed by servo logic, such as logic 160. In these embodiments Applicants' method transitions from step 714 to step 720 wherein the selected frequency components of step 714 are used to form a first filtered servo signal waveform. In certain embodiments, step 720 is performed by servo logic, such as logic 160. In certain of these embodiments, step 720 includes using Inverse Fast Fourier transforms.

In certain embodiments, Applicants' method transitions from step 710 to step 716 wherein Applicants' method determines the real and imaginary components of the (n)th measured servo signal waveform at (P) harmonics of the first positioning signal frequency, where (P) is an integer greater than or equal to 1 and less than or equal to about 6. In certain embodiments, step 716 is performed by servo logic, such as logic 160. In certain of these embodiments, step 716 includes using a Goertzel algorithm. In certain embodiments, Applicants' method uses a Goertzel algorithm defined by equation (1)

$$H f_i(z) = [1 - e^{(2\pi f_i/f_s)z^{-1}}]/1 - 2 \cos [2\pi f_i/f_s]z^{-1} + z^{-2} \qquad (1)$$

where $f_i$ is the frequency of interest, and $f_s$ is the sampling frequency.

In certain of these embodiments, servo logic 160 (FIG. 1) further includes digital signal processor 165 (FIG. 1) comprising a Goertzel filter. In certain embodiments, Applicants' apparatus includes a second order recursive Goertzel filter I.

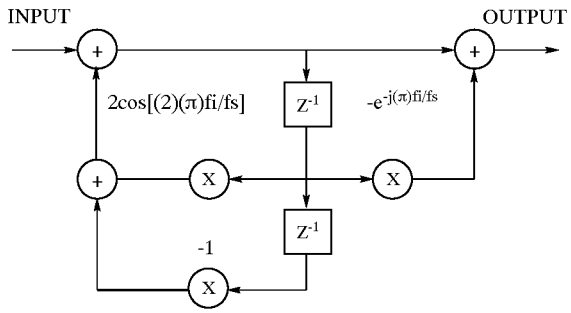

In these embodiments, Applicants' method transitions from step 716 to step 720 wherein Applicants' method forms the (n)th filtered servo signal waveform using the real and imaginary components of step 716.

As discussed above, independent position sensor ("IPS") 180 measures the position of tape head 190 with respect to the tape path 195. In step 722, Applicants' method samples the provided IPS signal at the (n)th sample rate. In certain embodiments, step 622 is performed by servo logic, such as logic 160. Applicants' method transitions from step 722 to step 724 wherein Applicants' method forms the (n)th measured IPS signal waveform. In certain embodiments, step 724 is performed by servo logic, such as logic 160. The digitized measured IPS signal waveform of step 724 is dominated by the sinusoidal pattern having the first positioning signal frequency, and not by the tape movement. The frequency of the first positioning signal frequency is known precisely, and anything that is not at that first positioning signal frequency, or its harmonics, comprises noise in the measurement.

In step 735, Applicants' method forms the (n)th filtered IPS signal waveform using the (n)th measured IPS waveform of step 724. In certain embodiments, step 740 is performed by servo logic, such as logic 160.

In certain embodiments, Applicants' method transitions from step 724 to step 726 wherein the (n)th measured IPS signal waveform is converted into a plurality of frequency components. In certain embodiments, step 726 is performed by servo logic, such as logic 160. In certain embodiments, step 726 includes using Fast Fourier transforms. Applicants' method transitions from step 726 to step 728 wherein Applicants' method selects from the frequency components of step 726 the frequency components at the first positioning signal frequency and at (P) harmonics of that first positioning signal frequency, wherein (P) is equal to or greater than 1 and less than or equal to about 6. In certain embodiments, step 728 is performed by servo logic, such as logic 160.

In these embodiments Applicants' method transitions from step 728 to step 735 wherein the selected frequency components of step 728 are used to form the (n)th filtered IPS signal waveform. In certain embodiments, step 735 is performed by servo logic, such as logic 160. In certain of these embodiments, step 735 includes using Inverse Fast Fourier transforms.

In certain embodiments, Applicants' method transitions from step 724 to step 730 wherein Applicants' method determines the real and imaginary components of the (n)th measured IPS signal waveform at (P) harmonics of the first positioning signal frequency. In certain embodiments, step 730 is performed by servo logic, such as logic 160. In certain of these embodiments, step 730 includes using a Goertzel algorithm.

In the Goertzel filter embodiments, Applicants' method transitions from step 730 to step 735 wherein Applicants' method forms the (n)th filtered IPS signal waveform using the real and imaginary components of step 730. In certain embodiments, step 632 is performed by servo logic, such as logic 160.

Applicants' method transitions from step 735 to step 740 wherein Applicants' method forms the (n)th transfer function using the (n)th filtered servo signal waveform of step 720 and the (n)th filtered IPS signal waveform of step 735. In certain embodiments, Applicants' method in step 740 forms an X/Y datapoint array comprising (N) actual datapoints determined by correlating the (n)th filtered servo signal waveform of step 720 with the (n)th filtered IPS waveform of step 735, where (N) is an integer greater than or equal to about 4 and less than or equal to about 16. In certain embodiments, (N) is 12. In certain embodiments, step 740 is performed by servo logic 160 (FIG. 1). Further in step 740, Applicants' method forms the (n)th transfer function using that X/Y datapoint array using and an (m)th order regression analysis, where (m) is greater than 1 and less than or equal to about 6. In certain embodiments, a second order curve fitting algorithm is used. In certain embodiments, a third order curve fitting algorithm is used. In certain embodiments, one or more higher order curve fitting algorithms are used wherein (m) is 4, 5, or 6.

Applicants' method transitions from step 740 to step 745 wherein Applicants' method utilizes the (n)th transfer function of step 740 to determine the (n)th expected position error signal ("PES") for the servo loop at the laterally offset servo index positions with respect to the sensed first set of linear servo edges. The method employs ratios for predetermined positions on either side of each edge. Ratios which are at outer positions, for example, ratios of "0" and of "1" cannot be sensed and determined. Hence in step 745, at the outer positions, the ratios are calculated using the (n)th transfer function. In certain embodiments, step 745 is performed by servo logic 160 (FIG. 1).

Applicants' method transitions from step 745 to step 750 wherein Applicants' method uses the (n)th transfer function of step 740 to determines (N) calculated datapoints $DP_{CAL(n)(i)}$. In step 750, Applicants' method determines the residual error $RE_{(n)}$ for the (n)th transfer function. In certain embodiments, step 750 further includes determining (N) calculated datapoints $DP_{CAL(n)(i)}$ using the (n)th transfer function of step 740. Applicants' method in step 750 determines (N) values for $RE_{(n)(i)}$ by comparing the (N) $DP_{CAL(n)(i)}$ values with the (N) $DP_{ACT(n)(i)}$ values. In certain embodiments, Applicants' method in step 750 sets $RE_{(n)}$ equal to the average of the $RE_{(n)(i)}$ values. In certain embodiments, step 750 is performed by servo logic 160 (FIG. 1).

Applicants' method transitions from step 750 to step 760 wherein Applicants' method determines if $RE_{(n)}$ is greater than $RE_{MAX}$. If Applicants' method determines in step 760 that $RE_{(n)} > RE_{MAX}$, then Applicants' method transitions from step 760 to step 770 wherein the (n+1)th positioning signal amplitude for the positioning signal of step 704 is adjusted based upon the residual error $RE_{(n)}$ determined for the (n)th transfer function. In certain embodiments, step 770 is performed by servo logic 160 (FIG. 1). Applicants' method transitions from step 770 to step 780 wherein (n) is incremented. In certain embodiments, step 780 is performed by servo logic 160 (FIG. 1). Applicants' method transitions from step 780 to step 702 wherein the calibration process of FIG. 7 is repeated using the (n+1)th positioning signal amplitude for the positioning signal.

Alternatively, if Applicants' method determines in step 760 that $RE_{(n)}$ is not greater than $RE_{MAX}$, then Applicants' method transitions from step 760 to step 790 wherein the (n)th transfer function is saved for subsequent use.

In certain embodiments, one or more individual steps of Applicants' method summarized in FIGS. 5, 6, and/or 7, may be combined, eliminated, or reordered. In certain embodiments, the steps of FIG. 5 may be implemented separately. In certain embodiments, the steps of FIG. 6 may be implemented separately. In certain embodiments, the steps of FIG. 7 may be implemented separately.

Applicants' invention further includes an article of manufacture comprising a computer useable medium having computer readable program code disposed therein for calibrating a servo sensor. Applicants' invention further includes a computer program product usable with a programmable computer processor having computer readable program code embodied therein for calibrating a servo sensor.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to calibrate a servo sensor disposed on a magnetic tape head disposed adjacent a magnetic tape, wherein said magnetic tape includes at least one servo pattern comprising at least one servo edge comprising an interface between a first recorded signal and a second recorded signal, wherein said servo sensor is capable of detecting said first recorded signal and said second recorded signal, and wherein an independent position sensor provides an IPS signal comprising the lateral position of said tape head with respect to the tape path, said method comprising the steps of:

positioning said tape head adjacent a magnetic tape while slewing through said servo pattern;
   providing a servo signal during said positioning, wherein said servo signal comprises the ratio of said detected first recorded signal and said detected second recorded signal;
   generating initial servo signal information;
   providing an IPS signal during said positioning;
   generating initial IPS signal information;
   calculating a first transfer function using said initial servo information and said initial IPS information;
   establishing the maximum allowable residual error $RE_{MAX}$;
   determining the first residual error $RE_{(1)}$;
   operative if $RE_{(1)}$ is less than $RE_{MAX}$, saving said first transfer function.

2. The method of claim 1, further comprising the steps of:
   providing a first sampling rate;
   sampling during said positioning said servo signal at said first sampling rate;
   sampling during said positioning said IPS signal at said first sampling rate.

3. The method of claim 1, wherein said initial servo information comprises a first measured servo signal waveform, and wherein said initial IPS signal information comprises a first measured IPS signal waveform.

4. The method of claim 3, wherein (n)>1 and wherein $RE_{(n-1)}$ is equal to or greater than $RE_{MAX}$, further comprising the steps of:
   positioning the tape head adjacent said magnetic tape using the (n−1)th transfer function;
   moving said magnetic tape;
   calculating the (n)th transfer function;
   determining if $RE_{(n)}$ exceeds $RE_{MAX}$;
   operative if $RE_{(n)}$ does not exceed $RE_{MAX}$, saving the (n)th transfer function.

5. The method of claim 4, further comprising the steps of:
   moving said tape head alternatingly in a first direction and an opposing second direction along a first axis as said tape moves along a tape path, wherein said first axis and said tape path are substantially orthogonal, wherein the position of said magnetic head along said first axis as a function of time comprises a periodic function having a positioning signal frequency and the (n)th positioning signal amplitude;
   forming the (n)th measured servo signal waveform;
   forming the (n)th filtered servo signal waveform;
   forming the (n)th measured IPS signal waveform;
   forming the (n)th filtered IPS signal waveform;
   forming the (n)th second transfer function;
   determining the (n)th residual error $RE_{(n)}$;
   comparing said $RE_{(n)}$ to said $RE_{MAX}$; and
   operative if $RE_{(n)}$ is less than or equal to $RE_{MAX}$, saving said (n)th transfer function.

6. The method of claim 5, wherein $RE_{(n)}$ is greater than $RE_{(n-1)}$, further comprising the steps of:
   setting the (n+1)th positioning signal amplitude based upon $RE_{(n)}$;
   setting (n) equal to (n+1);
   repeating the steps of claim 5.

7. The method of claim 5, further comprising the steps of:
   providing the (n)th sampling rate;
   sampling said servo signal at said (n)th sampling rate;
   sampling said IPS signal at said (n)th sampling rate.

8. The method of claim 5, further comprising the steps of:
   converting the (n)th measured servo signal waveform to the (n)th plurality of servo signal frequency components;
   determining the (n)th selected servo signal frequency components from said (n)th plurality of servo signal frequency components at (P) harmonics of said positioning signal frequency, wherein (P) is greater than or equal to 1 and less than or equal to about 6;
   computing the (n)th filtered servo signal waveform using said (n)th selected servo signal frequency components;
   converting the (n)th measured IPS signal waveform to the (n)th plurality of IPS signal frequency components;
   determining the (n)th selected IPS signal frequency components from said (n)th plurality of IPS signal frequency components at (P) harmonics of said positioning signal frequency, wherein (P) is greater than or equal to 1 and less than or equal to about 6; and computing the (n)th filtered IPS signal waveform using said (n)th selected IPS signal frequency components.

9. The method of claim 8, wherein said converting steps further comprise conducting Fast Fourier transforms, and wherein said computing steps further comprise conducting Inverse Fast Fourier transforms.

10. The method of claim 5, further comprising the steps of:

computing at (P) harmonics of said positioning signal frequency, the real components and the imaginary components of the (n)th measured servo signal waveform, wherein (P) is greater than or equal to 1 and less than or equal to about 6;

computing at (P) harmonics of said positioning signal frequency, the real components and the imaginary components of the (n)th measured IPS signal waveform;

forming the (n)th filtered servo signal waveform using said real components and said imaginary components of said (n)th measured servo signal waveform; and forming the (n)th filtered IPS signal waveform using said real components and said imaginary components of said (n)th measured IPS signal waveform.

11. The method of claim 10, wherein said computing steps further comprise using a Goertzel algorithm.

12. A method to calibrate a servo sensor disposed on a magnetic tape head disposed adjacent a magnetic tape, wherein said magnetic tape includes at least one servo pattern comprising at least one servo edge comprising an interface between a first recorded signal and a second recorded signal, wherein said servo sensor is capable of detecting said first recorded signal and said second recorded signal, and wherein an independent position sensor provides an IPS signal comprising the lateral position of said tape head with respect to the tape path, said method comprising the steps of:

positioning said tape head adjacent said magnetic tape while slewing through said servo pattern;

providing a servo signal during said positioning, wherein said servo signal comprises the ratio of said detected first recorded signal and said detected second recorded signal;

providing a first sampling rate;

sampling during said positioning said servo signal at said first sampling rate;

generating initial servo signal information, wherein said initial servo information comprises a first measured servo signal waveform;

providing an IPS signal during said positioning;

sampling during said positioning said IPS signal at said first sampling rate;

generating initial IPS signal information, wherein said initial IPS signal information comprises a first measured IPS signal waveform;

calculating a first transfer function;

establishing the maximum allowable residual error $RE_{MAX}$;

determining a first residual error $RE_{(1)}$;

operative if $RE_{(1)}$ is less than $RE_{MAX}$, saving said first transfer function;

moving said magnetic tape along a tape path;

moving said tape head alternatingly in a first direction and an opposing second direction along a first axis as said magnetic tape moves along said tape path, wherein said first axis and said tape path are substantially orthogonal, wherein the position of said magnetic head along said first axis as a function of time comprises a periodic function having said positioning signal frequency and a second amplitude;

providing a second sampling rate;

sampling said servo signal at said second sampling rate;

forming a second measured servo signal waveform;

computing at (P) harmonics of said positioning signal frequency, the real components and the imaginary components of said second measured servo signal waveform, wherein (P) is greater than or equal to 1 and less than or equal to about 6;

forming a second filtered servo signal waveform using said real components and said imaginary components of said second measured servo signal waveform;

sampling said IPS signal at said second sampling rate;

forming a second measured IPS signal waveform;

computing at (P) harmonics of that positioning signal frequency, the real components and the imaginary components of said second measured IPS signal waveform;

forming a second filtered IPS signal waveform using said real components and said imaginary components of said second measured IPS signal waveform;

wherein said computing steps further comprise using a Goertzel algorithm;

calculating a second transfer function;

determining a second residual error $RE_{(2)}$;

comparing said $RE_{(2)}$ to said $RE_{MAX}$; and operative if $RE_{(2)}$ is less than or equal to $RE_{MAX}$, saving said second transfer function.

13. An article of manufacture comprising a computer useable medium having computer readable program code disposed therein to calibrate a servo sensor disposed on a magnetic tape head disposed adjacent a magnetic tape, wherein said magnetic tape includes at least one servo pattern comprising at least one servo edge comprising an interface between a first recorded signal and a second recorded signal, wherein said servo sensor is capable of detecting said first recorded signal and said second recorded signal, and wherein an independent position sensor provides an IPS signal comprising the lateral position of said tape head with respect to the tape path, the computer readable program code comprising a series of computer readable program steps to effect:

positioning said tape head adjacent a magnetic tape while slewing through said servo pattern;

providing a servo signal during said positioning, wherein said servo signal comprises the ratio of said detected first recorded signal and said detected second recorded signal;

generating initial servo signal information;

providing an IPS signal during said positioning;

generating initial IPS signal information;

calculating a first transfer function using said initial servo information and said initial IPS information;

establishing the maximum allowable residual error $RE_{MAX}$;

determining the first residual error $RE_{(1)}$;

operative if $RE_{(1)}$ is less than $RE_{MAX}$, saving said first transfer function.

14. The article of manufacture of claim 13, said computer readable program code further comprising a series of computer readable program steps to effect:

receiving a first sampling rate;

sampling during said tape head positioning said servo signal at said first sampling rate;

sampling during said tape head positioning said IPS signal at said first sampling rate.

15. The article of manufacture of claim 13, wherein $RE_{(1)}$ is greater than $RE_{MAX}$, said computer readable program code further comprising a series of computer readable program steps to effect:

moving said magnetic tape along a tape path;

moving said tape head alternatingly in a first direction and an opposing second direction along a first axis as said tape moves along said tape path, wherein said first axis and said tape path are substantially orthogonal, wherein the position of said magnetic head along said first axis as a function of time comprises a periodic function having a positioning signal frequency and the (n)th positioning signal amplitude;

forming the (n)th measured servo signal waveform;

forming the (n)th filtered servo signal waveform;

forming the (n)th measured IPS signal waveform;

forming the (n)th filtered IPS signal waveform;

calculating the (n)th transfer function;

determining the (n)th residual error $RE_{(n)}$;

comparing said $RE_{(n)}$ to $RE_{(MAX)}$;

operative if $RE_{(n)}$ is less than or equal to $RE_{MAX}$, saving said (n)th transfer function.

16. The article of manufacture of claim 15, said computer readable program code further comprising a series of computer readable program steps to effect:

receiving the (n)th sampling rate;

sampling said servo signal at said (n)th sampling rate;

sampling said IPS signal at said (n)th sampling rate.

17. The article of manufacture of claim 16, wherein said computer readable program code further comprises a series of computer readable program steps to effect:

operative if $RE_{(n)}$ is greater $RE_{MAX}$, setting the (n+1)th positioning signal amplitude based upon $RE_{(n)}$;

setting (n) equal to (n+1);

moving said tape head alternatingly in a first direction and an opposing second direction along a first axis as said tape moves along said tape path, wherein said first axis and said tape path are substantially orthogonal, wherein the position of said magnetic head along said first axis as a function of time comprises a periodic function having a positioning signal frequency and the (n)th positioning signal amplitude;

forming the (n)th measured servo signal waveform;

forming the (n)th filtered servo signal waveform;

forming the (n)th measured IPS signal waveform;

forming the (n)th filtered IPS signal waveform;

calculating the (n)th transfer function;

determining the (n)th residual error $RE_{(n)}$;

comparing said $RE_{(n)}$ to $RE_{MAX}$;

operative if $RE_{(n)}$ is less than or equal to $RE_{MAX}$, saving said (n)th transfer function.

18. The article of manufacture of claim 15, wherein said computer readable program code further comprises a series of computer readable program steps to effect:

converting said (n)th measured servo signal waveform to the (n)th plurality of servo signal frequency components;

determining the (n)th selected servo signal frequency components from the (n)th plurality of servo signal frequency components at (P) harmonics of said positioning signal frequency, wherein (P) is greater than or equal to 1 and less than or equal to about 6;

computing said (n)th filtered servo signal waveform using the (n)th selected servo signal frequency components;

converting said (n)th measured IPS signal waveform to the (n)th plurality of IPS signal frequency components;

determining the (n)th selected IPS signal frequency components from said (n)th plurality of IPS signal frequency components at (P) harmonics of said positioning signal frequency, wherein (P) is greater than or equal to 1 and less than or equal to about 6; and computing said (n)th filtered IPS signal waveform using said (n)th selected IPS signal frequency components.

19. The article of manufacture of claim 18, wherein said computer readable program code further comprises a series of computer readable program steps to effect:

conducting Fast Fourier transforms; and conducting Inverse Fast Fourier transforms.

20. The article of manufacture of claim 15, further comprising the steps of:

computing at (P) harmonics of said positioning signal frequency, the real components and the imaginary components of said (n)th measured servo signal waveform, wherein (P) is greater than or equal to 1 and less than or equal to about 6;

computing at (P) harmonics of said positioning signal frequency, the real components and the imaginary components of said (n)th measured IPS signal waveform;

forming said (n)th filtered servo signal waveform using said real components and said imaginary components of said second measured servo signal waveform; and forming said (n)th filtered IPS signal waveform using said real components and said imaginary components of said second measured IPS signal waveform.

21. The article of manufacture of claim 20, wherein said computer readable program code further comprises a series of computer readable program steps to effect using a Goertzel algorithm.

22. An article of manufacture comprising a computer useable medium having computer readable program code disposed therein to calibrate a servo sensor disposed on a magnetic tape head disposed adjacent a magnetic tape, wherein said magnetic tape includes at least one servo pattern comprising at least one servo edge comprising an interface between a first recorded signal and a second recorded signal, wherein said servo sensor is capable of detecting said first recorded signal and said second recorded signal, and wherein an independent position sensor provides an IPS signal comprising the lateral position of said tape head with respect to the tape path, the computer readable program code comprising a series of computer readable program steps to effect:

positioning said tape head adjacent a magnetic tape while slewing though said servo pattern;

providing a servo signal during said positioning, wherein said servo signal comprises the ratio of said detected first recorded signal and said detected second recorded signal;

providing a first sampling rate;

sampling during said positioning said servo signal at said first sampling rate;

generating initial servo signal information, wherein said initial servo information comprises a first measured servo signal waveform;

providing said IPS signal during said positioning;

sampling during said positioning said IPS signal at said first sampling rate;

generating initial IPS signal information, wherein said initial IPS signal information comprises a first measured IPS signal waveform;

calculating a first transfer function;

establishing the maximum allowable residual error $RE_{MAX}$;

determining a first residual error $RE_{(1)}$;

operative if $RE_{(1)}$ is less than $RE_{MAX}$, saving said first transfer function;

moving said tape head alternatingly in a first direction and an opposing second direction along a first axis as said tape moves along a tape path, wherein said first axis and said tape path are substantially orthogonal, wherein the position of said magnetic head along said first axis as a function of time comprises a periodic function having said positioning signal frequency and the (n)th positioning signal amplitude, wherein (n)>1;

providing a second sampling rate;

sampling said servo signal at said second sampling rate;

forming a second measured servo signal waveform;

computing using a Goertzel algorithm at (P) harmonics of said positioning signal frequency, the real components and the imaginary components of said second measured servo signal waveform, wherein (P) is greater than or equal to 1 and less than or equal to about 6;

forming a second filtered servo signal waveform using said real components and said imaginary components of said second measured servo signal waveform;

sampling said IPS signal at said second sampling rate;

forming a second measured IPS signal waveform;

computing using a Goertzel algorithm at (P) harmonics of that positioning signal frequency, the real components and the imaginary components of said second measured IPS signal waveform;

forming a second filtered IPS signal waveform using said real components and said imaginary components of said second measured IPS signal waveform;

calculating a second transfer function;

determining a second residual error $RE_{(2)}$;

operative if $RE_{(2)}$ is less than or equal to $RE_{MAX}$, saving said second transfer function.

23. A computer program product usable with a programmable computer processor having computer readable program code embodied therein to calibrate a servo sensor disposed on a magnetic tape head disposed adjacent a magnetic tape, wherein said magnetic tape at least one servo pattern comprising at least one servo edge comprising an interface between a first recorded signal and a second recorded signal, wherein said servo sensor is capable of detecting said first recorded signal and said second recorded signal, and wherein an independent position sensor provides an IPS signal comprising the lateral position of said tape head with respect to the tape path, comprising:

computer readable program code which causes said programmable computer processor to position said tape head adjacent said magnetic tape while slewing through said servo pattern;

computer readable program code which causes said programmable computer processor to receive a servo signal during said positioning, wherein said servo signal comprises the ratio of said detected first recorded signal and said detected second recorded signal;

computer readable program code which causes said programmable computer processor to generate initial servo signal information;

computer readable program code which causes said programmable computer processor to receive an IPS signal during said positioning;

computer readable program code which causes said programmable computer processor to generate initial IPS signal information;

computer readable program code which causes said programmable computer processor to calculate a first transfer function using said initial servo information and said initial IPS information;

computer readable program code which causes said programmable computer processor to receive the maximum allowable residual error $RE_{MAX}$;

computer readable program code which causes said programmable computer processor to determine the first residual error $RE_{(1)}$;

computer readable program code which, if $RE_{(1)}$ is less than $RE_{MAX}$, causes said programmable computer processor to save said first transfer function.

24. The computer program product of claim 23, further comprising:

computer readable program code which causes said programmable computer processor to receive a first sampling rate;

computer readable program code which causes said programmable computer processor to sample during said positioning said servo signal at said first sampling rate;

computer readable program code which causes said programmable computer processor to sample during said positioning said IPS signal at said first sampling rate.

25. The computer program product of claim 23, further comprising:

computer readable program code which causes said programmable computer processor to move said tape head alternatingly in a first direction and an opposing second direction along a first axis as said tape moves along a tape path, wherein said first axis and said tape path are substantially orthogonal, wherein the position of said magnetic head along said first axis as a function of time comprises a periodic function having a positioning signal frequency and the (n)th positioning signal amplitude;

computer readable program code which causes said programmable computer processor to form the (n)th measured servo signal waveform;

computer readable program code which causes said programmable computer processor to form the (n)th filtered servo signal waveform;

computer readable program code which causes said programmable computer processor to form the (n)th measured IPS signal waveform;

computer readable program code which causes said programmable computer processor to form the (n)th filtered IPS signal waveform;

computer readable program code which causes said programmable computer processor to calculate the (n)th transfer function;

computer readable program code which causes said programmable computer processor to determine the (n)th residual error $RE_{(1)}$;

computer readable program code which causes said programmable computer processor to compare $RE_{(n)}$ to $RE_{MAX}$; and computer readable program code which, if $RE_{(n)}$ is less than or equal to $RE_{MAX}$, causes said programmable computer processor to save said (n)th transfer function.

26. The computer program product of claim 25, further comprising computer readable program code which causes said programmable computer processor to receive the (n)th sampling rate;

computer readable program code which causes said programmable computer processor to sample said servo signal at said (n)th sampling rate;

computer readable program code which causes said programmable computer processor to sample said IPS signal at said (n)th sampling rate.

27. The computer program product of claim 25, further comprising:

computer readable program code which causes said programmable computer processor to convert said (n)th measured servo signal waveform to the (n)th plurality of servo signal frequency components;

computer readable program code which causes said programmable computer processor to determine the (n)th selected servo signal frequency components from said (n)th plurality of servo signal frequency components at (P) harmonics of said positioning signal frequency, wherein (P) is greater than or equal to 1 and less than or equal to about 6;

computer readable program code which causes said programmable computer processor to compute said (n)th filtered servo signal waveform using said (n)th selected servo signal frequency components;

computer readable program code which causes said programmable computer processor to convert said (n)th measured IPS signal waveform to the (n)th plurality of IPS signal frequency components;

computer readable program code which causes said programmable computer processor to determine the (n)th selected IPS signal frequency components from said (n)th plurality of IPS signal frequency components at (P) harmonics of said positioning signal frequency, wherein (P) is greater than or equal to 1 and less than or equal to about 6; and computer readable program code which causes said programmable computer processor to compute said (n)th filtered IPS signal waveform using said (n)th selected IPS signal frequency components.

28. The computer program product of claim 27, further comprising:

computer readable program code which causes said programmable computer processor to conduct Fast Fourier transforms; and computer readable program code which causes said programmable computer processor to conduct Inverse Fast Fourier transforms.

29. The computer program product of claim 25, further comprising computer readable program code which causes said programmable computer processor to compute at (P) harmonics of said positioning signal frequency, the real components and the imaginary components of said (n)th measured servo signal waveform, wherein (P) is greater than or equal to 1 and less than or equal to about 6;

computer readable program code which causes said programmable computer processor to compute at (P) harmonics of said positioning signal frequency, the real components and the imaginary components of said (n)th measured IPS signal waveform;

computer readable program code which causes said programmable computer processor to form said (n)th filtered servo signal waveform using said real components and said imaginary components of said (n)th measured servo signal waveform; and computer readable program code which causes said programmable computer processor to form said (n)th filtered IPS signal waveform using said real components and said imaginary components of said (n)th measured IPS signal waveform.

30. The computer program product of claim 29, further comprising computer readable program code which causes said programmable computer processor to use a Goertzel algorithm.

31. A computer program product usable with a programmable computer processor having computer readable program code embodied therein to calibrate a servo sensor disposed on a magnetic tape head disposed adjacent a magnetic tape, wherein said magnetic tape includes at least one servo pattern comprising at least one servo edge comprising an interface between a first recorded signal and a second recorded signal, wherein said servo sensor is capable of detecting said first recorded signal and said second recorded signal, and wherein an independent position sensor provides an IPS signal comprising the lateral position of said tape head with respect to the tape path, comprising:

computer readable program code which causes said programmable computer processor to position said tape head adjacent said magnetic tape while slewing through said servo pattern;

computer readable program code which causes said programmable computer processor to receive a servo signal during said positioning, wherein said servo signal comprises the ratio of said detected first recorded signal and said detected second recorded signal;

computer readable program code which causes said programmable computer processor to receive a first sampling rate;

computer readable program code which causes said programmable computer processor to sample during said positioning said servo signal at said first sampling rate;

computer readable program code which causes said programmable computer processor to generate initial servo signal information, wherein said initial servo information comprises a first measured servo signal waveform;

computer readable program code which causes said programmable computer processor to receive an IPS signal during said positioning;

computer readable program code which causes said programmable computer processor to sample during said positioning said IPS signal at said first sampling rate;

computer readable program code which causes said programmable computer processor to generate initial IPS signal information, wherein said initial IPS signal information comprises a first measured IPS signal waveform;

computer readable program code which causes said programmable computer processor to calculate a first transfer function;

computer readable program code which causes said programmable computer processor to determine the maximum allowable residual error $RE_{MAX}$;

computer readable program code which causes said programmable computer processor to determine a first residual error $RE_{(1)}$;

computer readable program code which, if $RE_{(1)}$ is less than $RE_{MAX}$, causes said programmable computer processor to save said first transfer function;

computer readable program code which causes said programmable computer processor to move said tape head alternatingly in a first direction and an opposing second direction along a first axis as said tape moves along a tape path, wherein said first axis and said tape path are substantially orthogonal, wherein the position of said magnetic head along said first axis as a function of time comprises a periodic function having said positioning signal frequency and the second positioning signal amplitude;

computer readable program code which causes said programmable computer processor to receive a second sampling rate;

computer readable program code which causes said programmable computer processor to sample said servo signal at said second sampling rate;

computer readable program code which causes said programmable computer processor to form a second measured servo signal waveform;

computer readable program code which causes said programmable computer processor to compute at (P) harmonics of said positioning signal frequency, the real components and the imaginary components of said second measured servo signal waveform, wherein (P) is greater than or equal to 1 and less than or equal to about 6;

computer readable program code which causes said programmable computer processor to form a second filtered servo signal waveform using said real components and said imaginary components of said second measured servo signal waveform using a Goertzel algorithm;

computer readable program code which causes said programmable computer processor to sample said IPS signal at said second sampling rate;

computer readable program code which causes said programmable computer processor to form a second measured IPS signal waveform;

computer readable program code which causes said programmable computer processor to compute at (P) harmonics of that positioning signal frequency, the real components and the imaginary components of said second measured IPS signal waveform, wherein (P) is greater than or equal to 1 and less than or equal to about 6;

computer readable program code which causes said programmable computer processor to form a second filtered IPS signal waveform using said real components and said imaginary components of said second measured IPS signal waveform using a Goertzel algorithm;

computer readable program code which causes said programmable computer processor to calculate a second transfer function;

computer readable program code which causes said programmable computer processor to determine a second residual error $RE_{(2)}$;

computer readable program code which, if $RE_{(2)}$ is less than or equal to $RE_{MAX}$, causes said programmable computer processor to save said second transfer function.

* * * * *